(12) United States Patent
Kaltenbach

(10) Patent No.: US 9,222,563 B2
(45) Date of Patent: Dec. 29, 2015

(54) MANUAL TRANSMISSION OF A HYBRID DRIVE FOR A MOTOR VEHICLE

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 9 days.

(21) Appl. No.: 14/003,457

(22) PCT Filed: Feb. 1, 2012

(86) PCT No.: PCT/EP2012/051629
§ 371 (c)(1),
(2), (4) Date: Sep. 6, 2013

(87) PCT Pub. No.: WO2012/123169
PCT Pub. Date: Sep. 20, 2012

(65) Prior Publication Data
US 2014/0000412 A1    Jan. 2, 2014

(30) Foreign Application Priority Data

Mar. 15, 2011 (DE) .......................... 10 2011 005 561

(51) Int. Cl.
*F16H 3/093* (2006.01)
*F16H 3/12* (2006.01)
(Continued)

(52) U.S. Cl.
CPC .............. *F16H 37/065* (2013.01); *B60K 6/387* (2013.01); *B60K 6/48* (2013.01); *B60K 6/547* (2013.01);
(Continued)

(58) Field of Classification Search
CPC ..... F16H 37/065; F16H 3/006; F16H 61/688; F16H 2200/0047; F16H 2003/0826; B60K 6/387; B60K 6/48; B60K 6/547; B60K 2006/4825; B60K 2006/541; B60K 2006/4841; B60K 6/36; B60K 6/40

USPC ........ 74/330, 331, 325, 329, 661; 475/5, 151, 475/207; 180/65.1, 65.21, 65.22, 65.265; 903/902, 906, 919

See application file for complete search history.

(56) References Cited

U.S. PATENT DOCUMENTS 6,634,247 B2    10/2003    Pels et al.
7,287,442 B2    10/2007    Gumpoltsberger
(Continued)

FOREIGN PATENT DOCUMENTS

DE    35 46 454 A1    2/1987
DE    199 60 621 A1    6/2001
(Continued)

OTHER PUBLICATIONS

Tenberge P: "Double-Clutch Transmission—Power-Shiftable Winding Transmission", VDI Berischte, Duesseldorf, Germany, vol. 1665, Mar. 13, 2002.
(Continued)

*Primary Examiner* — Ha D Ho
*Assistant Examiner* — Jude Agendia
(74) *Attorney, Agent, or Firm* — Davis & Bujold, P.L.L.C.; Michael J. Bujold

(57) ABSTRACT

A hybrid drive manual transmission, for a motor vehicle, having two input shafts (GE1, GE2) and one common output shaft. The first shaft (GE1) can connect with a combustion engine drive shaft and can drive the output shaft via a first group of gearwheel sets. The second shaft (GE2) can connect with an electric machine and, via a second group of gearwheel sets, the output shaft. The input shafts (GE1, GE2) can connect with one another via a coupling device. For inexpensive production, the transmission is derived from a double clutch transmission having a hollow input shaft (GE2) and a coaxial inner input shaft (GE1) and a coupling device of which comprises a gear step and/or a shiftable clutch, which replaces that gearset and associated gear clutch. The gearset of the underlying double clutch transmission is allocated to first input shaft (GE1) and adjacent the gear-side end of shaft (GE2).

27 Claims, 15 Drawing Sheets

(51) Int. Cl.
  *B60K 6/387*    (2007.10)
  *B60K 6/48*     (2007.10)
  *B60K 6/547*    (2007.10)
  *F16D 23/02*    (2006.01)
  *F16H 37/06*    (2006.01)
  *B60K 6/54*     (2007.10)
  *F16H 3/00*     (2006.01)
  *F16H 3/08*     (2006.01)

(52) U.S. Cl.
  CPC . *B60K 2006/4825* (2013.01); *B60K 2006/4841* (2013.01); *B60K 2006/541* (2013.01); *F16H 3/006* (2013.01); *F16H 2003/0826* (2013.01); *Y02T 10/6221* (2013.01); *Y02T 10/6252* (2013.01); *Y10S 903/902* (2013.01); *Y10T 74/19014* (2015.01)

(56)　　　　　　References Cited

U.S. PATENT DOCUMENTS

| | | | | |
|---|---|---|---|---|
| 8,056,663 | B2* | 11/2011 | Schoenek | 180/65.6 |
| 8,205,516 | B2* | 6/2012 | Kobayashi et al. | 74/331 |
| 8,257,221 | B2 | 9/2012 | Leufgen | |
| 8,342,049 | B2 | 1/2013 | Rieger | |
| 8,393,238 | B2 | 3/2013 | Gumpoltsberger et al. | |
| 8,795,115 | B2* | 8/2014 | Puiu | 475/5 |
| 2002/0129671 | A1* | 9/2002 | Yamasaki et al. | 74/325 |
| 2005/0000307 | A1* | 1/2005 | Gumpoltsberger | 74/331 |
| 2005/0139035 | A1* | 6/2005 | Lee et al. | 74/661 |
| 2006/0016656 | A1* | 1/2006 | Kuepper | 192/3.61 |
| 2006/0021456 | A1* | 2/2006 | Hughes | 74/340 |
| 2006/0130601 | A1 | 6/2006 | Hughes | |
| 2010/0120580 | A1 | 5/2010 | Mepham et al. | |
| 2010/0197436 | A1 | 8/2010 | Ideshio et al. | |
| 2010/0269611 | A1* | 10/2010 | Rieger | 74/331 |
| 2010/0311540 | A1 | 12/2010 | Hellenbroich | |
| 2011/0073393 | A1* | 3/2011 | Sasaki | 180/65.22 |
| 2011/0111910 | A1* | 5/2011 | Ideshio et al. | 475/5 |

FOREIGN PATENT DOCUMENTS

| | | |
|---|---|---|
| DE | 101 33 695 A1 | 3/2002 |
| DE | 103 05 241 A1 | 9/2004 |
| DE | 10 2005 048 938 A1 | 4/2007 |
| DE | 10 2005 049 992 A1 | 4/2007 |
| DE | 10 2006 036 758 A1 | 2/2008 |
| DE | 10 2007 042 949 A1 | 4/2009 |
| DE | 10 2007 049 266 A1 | 4/2009 |
| DE | 10 2007 049 271 A1 | 4/2009 |
| DE | 10 2009 000 725 A1 | 8/2010 |
| DE | 10 2010 030 569 A1 | 12/2011 |
| EP | 1 610 038 A1 | 12/2005 |
| EP | 1 972 481 A1 | 9/2008 |
| FR | 2 811 395 A1 | 1/2002 |
| JP | 2010-203605 A | 9/2010 |
| WO | 2007/042109 A1 | 4/2007 |
| WO | 2008/138387 A1 | 11/2008 |
| WO | 2009/050078 A2 | 4/2009 |
| WO | 2012/000706 A1 | 1/2012 |

OTHER PUBLICATIONS

German Search Report Corresponding to 10 2011 005 451.0 mailed Jan. 23, 2012.
German Search Report Corresponding to 10 2011 005 532.0 mailed Jan. 27, 2012.
International Search Report Corresponding to PCT/EP2012/051626 mailed Mar. 20, 2012.
International Search Report Corresponding to PCT?EP2012/051629 mailed May 14, 2012.
International Search Report Corresponding to PCT/EP2012/051632 mailed Mar. 20, 2012.
Written Opinion Corresponding to PCT/EP2012/051626 mailed Mar. 20, 2012.
Written Opinion Corresponding to PCT/EP2012/051629 mailed May 14, 2012.
Written Opinion Corresponding to PCT/EP2012/051632 mailed Mar. 20, 2012.

* cited by examiner

MANUAL TRANSMISSION OF A HYBRID DRIVE FOR A MOTOR VEHICLE

This application is a National Stage completion of PCT/EP2012/051629 filed Feb. 1, 2012, which claims priority from German patent application serial no. 10 2011 005 561.4 filed Mar. 15, 2011.

FIELD OF THE INVENTION

The invention relates to a manual transmission of a hybrid drive for a motor vehicle having two input shafts and a common output shaft, wherein the first input shaft can be connected with the drive shaft of an internal combustion engine and can be drivingly connected with the output shaft by means of a first group of selectively shiftable gearwheel sets, wherein the second input shaft is drivingly connected with the rotor of an electric machine that can be operated as a motor and as a generator and can be drivingly connected with the output shaft by means of a second group of selectively shiftable gearwheel sets, and wherein both input shafts can be drivingly connected with one another by means of a shiftable coupling device.

BACKGROUND OF THE INVENTION

A manual transmission of this kind comprises an internal combustion power transmission branch and an electromotive power transmission branch, which are brought together at the output shaft. The internal combustion power transmission branch comprises the first input shaft, the gear sets of the first group as well as the output shaft and allows the transmission of torque between the internal combustion engine, and the drive wheels of the motor vehicle drivingly connected with the output shaft. The electromotive power transmission branch comprises the second input shaft, the gear sets of the second group as well as the output shaft and allows the transmission of torque between the electric machine and the drive wheels of the motor vehicle. When the coupling device is disengaged, a purely internal combustion drive operation is thereby possible by means of a engaged gear set of the first group, a purely electromotive drive operation is possible by means of an engaged gear set of the second group, and a combined drive operation of both aggregates (internal combustion engine and electric machine) with operation of the electric machine as a motor or generator and with a fixed transmission ratio is possible by means of an engaged gear set of the first and second group respectively.

When the motor vehicle is at a standstill, the internal combustion engine can be started by means of the electric machine by engaging the coupling device. In addition, the gear sets of the second group are made available for the internal combustion drive operation and the gear sets of the first group are made available for the electromotive drive operation by engaging the coupling device. With an appropriate transmission ratio and allocation of the gear sets, fewer gear sets are needed overall and accordingly, the manual transmission can have a simpler and more compact design.

DE 199 60 621 B4 describes a manual transmission of this kind in three alternative designs. In all embodiments, the internal combustion power transmission branch has a first countershaft, which can be drivingly connected with the drive shaft of an internal combustion engine on the input side by means of a input constant, a first input shaft and a friction clutch, and can be drivingly connected on the output side with an output shaft by means of a first group of selectively shiftable gearwheel sets. In the first embodiment according to FIG. 1 there, a second input shaft is designed as a second countershaft, which can be connected in a rotationally fixed manner with the rotor of an electric machine and drivingly connected with the output shaft by means of a second group of selectively shiftable gearwheel sets. In this case, the coupling device comprises a drive stage disposed between the input shaft and the second countershaft as well as a shiftable clutch, which is disposed between the driving wheel of the drive stage on the countershaft side and the second countershaft.

In the second and third embodiment according to the FIGS. 2 and 3 there, the second input shaft is formed as a hollow rotor shaft, which is disposed coaxially over the input shaft and connected in a rotationally fixed manner with the rotor of an electric machine disposed coaxially over the first input shaft. The rotor shaft is drivingly connected with the second countershaft by means of a second input constant, which can be drivingly connected with the output shaft by means of the second group of selectively shiftable gearwheel sets. In this case, the coupling device comprises a shiftable clutch, which is disposed between the first input shaft and the rotor shaft.

In a further manual transmission of this kind according to WO 2008/138 387 A1, both input shafts are formed as countershafts. The first input or countershaft of the internal combustion power transmission branch can be connected with the drive shaft of an internal combustion engine on the input side by means of a controllable separator clutch and can be drivingly connected with an output shaft on the output side by means of a first group of selectively shiftable gearwheel sets. The second input or countershaft of the electromotive power transmission branch is connected with the rotor of an electric machine on the input side in a rotationally fixed manner and can be drivingly connected on the output side with the output shaft by means of a second group of selectively shiftable gearwheel sets. The gear sets of both groups are disposed in common radial planes and each use a common power take-off gear disposed on the output shaft. In this case, the coupling device is designed in such a way that the idler gears and the allocated gear clutches of two axially adjacent gear sets of the second group on the output shaft, which are combined into a shift set, are disposed on the output shaft, whereby it is possible to couple both input shafts independently of the shifting of one of the respective gear sets.

The known manual transmissions that are designed specifically for use in a hybrid drive of a motor vehicle are therefore relatively complex and expensive to manufacture. The market success of hybrid-powered vehicles, however, depends largely on favorable manufacturing costs of the components of the hybrid power train, and in particular of the manual transmission.

SUMMARY OF THE INVENTION

The primary object of the present invention is therefore to provide a manual transmission of a hybrid drive of said kind, which can be manufactured in an especially cost-effective way without substantial functional limitations.

A first solution for this objective is achieved with a manual transmission which is derived from a double clutch transmission having two coaxial input shafts, the first input shaft of which is disposed centrally, the second input shaft of which is formed as a hollow shaft as well as disposed coaxially above the first input shaft, and the coupling device of which comprises a gear step and/or a shiftable clutch, which is provided instead of that gear set and the allocated gear clutch thereof, wherein that gear set is allocated to the first input shaft in the underlying double clutch transmission and is disposed axially adjacent to the gear-side end of the second input shaft.

The invention is thus based on a known manual transmission of a hybrid drive for a motor vehicle, which has two input shafts GE1, GE2 and a common output shaft GA. In this manual transmission, the first input shaft GE1 can be connected with the drive shaft of an internal combustion engine VM and can be drivingly connected with the output shaft GA by means of a first group of selectively shiftable gearwheel sets (G1, G3, G5; G2, G4, G6). The second input shaft GE2 is drivingly connected with the rotor of an electric machine that can be operated as a motor and as a generator EM and can be drivingly connected with the output shaft GA by means of a second group of selectively shiftable gearwheel sets (G2, G4; G1, G3, G5, G7). Both input shafts GE1, GE2 can be drivingly connected with one another by means of a shiftable coupling device.

According to the invention it is provided that this manual transmission is derived from a double clutch transmission having two coaxial input shafts GE1, GE2 in the aforementioned arrangement for the cost-effective manufacture of a manual transmission of this kind. The coupling device thereby comprises a gear step and/or a shiftable clutch, which is provided instead of that gear set and the allocated gear clutch thereof, wherein that gear set is allocated to the first input shaft GE1 in the underlying double clutch transmission and is disposed axially adjacent to the gear-side end of the second input shaft GE2. This means that the respective gear set available in the underlying double clutch transmission and the gear clutch allocated to this transmission are omitted in the manual transmission according to the invention and replaced by the gear step and/or the shifting clutch of the coupling device in a manner that requires no additional installation space in order to connect the two input shafts GE1, GE2. In this way, a manual transmission of a hybrid drive is created that is largely identical to the underlying double clutch transmission, i.e. it has a large number of parts that are identical thereto, and therefore can be manufactured in a cost-effective manner, for example on the same production line as the double clutch transmission.

In order that the gear set that is omitted, as compared with the underlying double clutch transmission, does not lead to functional limitations in the manual transmission or in the respective hybrid drive, the respective gear set disposed in the underlying double clutch transmission, axially adjacent to the gear-side end of the second input shaft GE2, should preferably be designed as a reverse gear set R and allocated to the reverse gear. It is possible to omit the gear set of the reverse gear in the manual transmission of the hybrid drive without a problem, since a reverse start or reverse maneuvering is possible by means of a gear set of a forward gear in conjunction with a reverse of rotation by means of the electric machine. If this suitable arrangement of the reverse gear set R is not provided in the underlying double clutch transmission, that arrangement can be created if necessary by a corresponding modification of the axial arrangement of the gear sets allocated to the input shaft, if the spatial conditions allow for this.

In the underlying double clutch transmission (as shown in FIG. 10), when the gear sets (G1-G5, R) are each disposed immediately between one of the two input shafts GE1, GE2 and the output shaft GA, and at least the idler gear as well as the allocated gear clutch C of the gear set R allocated to the first input shaft GE1 and disposed axially adjacent to the gear-side end of the second input shaft GE2, are disposed on the first input shaft GE1, the coupling device can comprise only one shifting clutch S for directly coupling the first input shaft GE1 with the gear-side end of the second input shaft GE2.

In the underlying double clutch transmission (as shown in FIG. 10), when the idler gear and the allocated gear clutch D of the axially adjacent gear set G1 allocated to the first input shaft GE1 are also disposed on the first input shaft GE1, the shifting clutch S of the coupling device is integrated with the gear clutch D of this remaining gear set G1 in a common shift set S2a in order to simplify the control mechanism, by means of which common shift set S2a the first input shaft GE1 is connected with the second input shaft GE2 in a rotationally fixed manner in a first shift position, is decoupled in a neutral position, and is coupled with the idler gear of the remaining gear set G1 in a rotationally fixed manner in a second shift position.

In the underlying double clutch transmission (as shown in FIG. 11), when the gear sets (G1-G5, R) are each disposed immediately between one of the two input shafts GE1, GE2 and the output shaft GA, and at least the idler gears and the allocated gear clutches C, D of the gear sets R, G1, both allocated to the first input shaft GE1 and disposed axially adjacent to the gear-side end of the second input shaft GE2, are disposed on the output shaft GA, the coupling device comprises a gear step GK, which comprises an idler gear rotatably mounted on the output shaft GA and a fixed gear disposed on the gear-side end of the second input shaft GE2 in a rotationally fixed manner, that coupling device also comprising a shifting clutch T for coupling the idler gear of the remaining gear set G1 of the two gear sets R, G1 with the idler gear of the gear step GK.

The transmission ratio $i_{GK}$ of the gear step GK preferably corresponds to the transmission ratio $i_{G1}$ of the gear set (G1) that can be coupled by means of the shifting clutch T of the coupling device ($i_{GK}=i_{G1}$), since the effective clutch transmission ratio $i_K$ between the first input shaft GE1 and the second input shaft GE2 is then equal to one ($i_K=i_{G1}/i_{GK}=1$) when the shifting clutch T is engaged.

If, in addition to the aforementioned features, the idler gear and the gear clutch B of the transmission-internal gear set G4 allocated to the second input shaft GE2 and disposed on the gear-side end of the second input shaft GE2 are also disposed on the output shaft GA in the underlying double clutch transmission (as shown in FIG. 11), the coupling device can also alternatively comprise the transmission-internal gear set G4 and a shifting clutch U for coupling the idler gear of the remaining gear set (G1) of the two gear sets R, G1 with the idler gear of the transmission-internal gear set G4. In this case, the advantage of saving a separate gear step GK counteracts the possible disadvantage of a clutch transmission ratio $i_K$ between the two input shafts GE1, GE2 that is not equal to one ($i_K \neq 1$).

In the underlying double clutch transmission (as shown in FIG. 12), when the gear sets (G1-G7, R) are each disposed between one of the two input shafts GE1, GE2 and one of two countershafts VG1, VG2, each drivingly connected with the output shaft GA by means of an output constant AK1, AK2, and at least the idler gears and the allocated gear clutches C, D of the gear sets R, G6, both allocated to the first input shaft GE1 and a countershaft (VG2) of both countershafts VG1, VG2 as well as disposed axially adjacent to the gear-side end of the second input shaft GE2, are disposed on the respective countershaft VG2, the coupling device preferably comprises a gear step GK', which comprises an idler gear rotatably mounted on the respective countershaft VG2 and a fixed gear disposed on the gear-side end of the second input shaft GE2 in a rotationally fixed manner, that coupling device also comprising a shifting clutch V for coupling the idler gear of the remaining gear set (G6) of the two gear sets R, G6 with the idler gear of the gear step GK'.

In this case as well, the transmission ratio $i_{GK}'$ of the gear step GK' preferably corresponds to the transmission ratio $i_{G6}$ of the gear set (G6) that can be coupled by means of the shifting clutch V of the coupling device ($i_{GK}'=i_{G6}$), so that the effective clutch transmission ratio $i_K$ between the first input shaft GE1 and the second input shaft GE2 is equal to one ($i_K=i_{G6}/i_{GK}'=1$) when the shifting clutch V is engaged.

If, in addition to the aforementioned features, the idler gear and the allocated gear clutch B of the transmission-internal gear set G7, allocated to the second input shaft GE2 and disposed on the gear-side end of the second input shaft GE2, are also disposed on the respective countershaft VG2 in the underlying double clutch transmission (as shown in FIG. 12), the coupling device can alternatively also comprise the transmission-internal gear set G7 and a shifting clutch W for coupling the idler gear of the remaining gear set (G6) of the two gear sets R, G6 with the idler gear of the transmission-internal gear set G7. In this case as well, the advantage of saving a separate gear step GK' counteracts the possible disadvantage of a clutch transmission ratio $i_K$ between the two input shafts GE1, GE2 that is not equal to one ($i_K \neq 1$).

In the aforementioned embodiments of the manual transmission (according to FIGS. 4 to 7), in order to simplify the control mechanism, it is preferably provided that the shifting clutch (T, U; V, W) of the respective coupling device be integrated with the gear clutch D of the remaining gear set (G1; G6) of the two gear sets (R, G1; R, G6) in a common shift set (S2b, S2c; S2d, S2e), by means of which the idler gear of the remaining gear set (G1; G6) of the two gear sets (R, G1; R, G6) is coupled with the idler gear of the gear step (GK; GK') or the transmission-internal gear set (G4; G7) in a rotationally fixed manner in a first shift position, is decoupled in a neutral position, and coupled with the output shaft GA or with the respective countershaft VG2 in a rotationally fixed manner in a second shift position.

A second solution to the stated objective according to the invention is achieved a manual transmission which is derived from a double clutch transmission having two coaxial input shafts, the first input of which shaft is centrally disposed, the second input shaft of which is formed as a hollow shaft and is disposed coaxially above the first input shaft, and the coupling device comprises a gear step and/or a shiftable clutch, which is provided instead of that gear set and the allocated gear clutch thereof, wherein that gear set is allocated to the second input shaft in the underlying double clutch transmission and is disposed axially adjacent to the gear-side end of the second input shaft.

Accordingly, the invention according to the second solution to the stated objective relates to a manual transmission of a hybrid drive for a motor vehicle having two input shafts and a common output shaft, wherein the first input shaft can be connected with the drive shaft of an internal combustion engine and can be drivingly connected with the output shaft by means of a first group of selectively shiftable gearwheel sets, wherein the second input shaft is drivingly connected with the rotor of an electric machine that can be operated as a motor and as a generator and can be drivingly connected with the output shaft by means of a second group of selectively shiftable gearwheel sets, and wherein both input shafts can be drivingly connected with one another by means of a shiftable coupling device.

Analogous to the first solution to the stated objective, in order to achieve the inexpensive manufacture of a manual transmission of this kind, it is provided that the manual transmission is derived from a double clutch transmission having two coaxial input shafts, the first input shaft of which is centrally disposed, the second input shaft of which is formed as a hollow shaft and is disposed coaxially above the first input shaft, and the coupling device of which comprises a gear step and/or a shiftable clutch, which is provided instead of that gear set and the allocated gear clutch thereof, wherein that gear set is allocated to the second input shaft in the underlying double clutch transmission and is disposed axially adjacent to the gear-side end of the second input shaft.

This manual transmission of a hybrid drive is also largely identical to the underlying double clutch transmission, has a large number of parts that are identical thereto, and therefore can be manufactured in a cost-effective manner, for example on the same production line as the double clutch transmission.

In order to avoid functional limitations in the manual transmission or in the respective hybrid drive, the gear set disposed in the underlying double clutch transmission on the gear-side end of the second input shaft and replaced in the manual transmission of the hybrid drive by the coupling device should also preferably be designed as a reverse gear set and allocated to the reverse gear, since it is possible to omit a reverse gear in the manual transmission of the hybrid drive without a problem due to the reversible rotational direction of the electric machine.

In accordance with the second solution of the stated objective with the underlying double clutch transmission (as shown in FIG. 13), when the gear sets (G1-G5, R) are each disposed immediately between one of the two input shafts GE1, GE2 and the output shaft GA, and at least the idler gear and the allocated gear clutch C of the gear set R allocated to the second input shaft GE2 and disposed on the gear-side end of the second input shaft GE2 are disposed on the second input shaft GE2, the coupling device can comprise only a shifting clutch S for directly coupling the gear-side end of the second input shaft GE2 with the first input shaft GE1.

In the underlying double clutch transmission (as shown in FIG. 13), when the idler gear and the allocated gear clutch D of the gear set G1, allocated to the first input shaft GE1 and disposed axially adjacent to the gear-side end of the second input shaft GE2, are disposed on the first input shaft GE1, the shifting clutch S of the coupling device is preferably integrated with the gear clutch D of this gear set G1 in a common shift set S2a in order to simplify the control mechanism, by means of which common shift set S2a the first input shaft GE1 is coupled with the second input shaft GE2 in a rotationally fixed manner in a first shift position, is decoupled in a neutral position, and is coupled with the idler gear or the respective gear set G1 in a rotationally fixed manner in a second shift position.

In the underlying double clutch transmission (as shown in FIG. 14), when the gear sets (G1-G5, R) are each disposed immediately between one of the two input shafts GE1, GE2 and the output shaft GA, and at least the idler gears and the allocated gear clutches C, D of the transmission-internal gear set G1 allocated to the first input shaft GE1 and disposed axially adjacent to the gear-side end of the second input shaft GE2 as well as the gear set R allocated to the second input shaft GE2 and disposed on the gear-side end of the second input shaft GE2, are disposed on the output shaft GA, the coupling device comprises a gear step GK, which comprises an idler gear rotatably mounted on the output shaft GA and a fixed gear disposed on the gear-side end of the second output shaft GE2 in a rotationally fixed manner, that coupling device also comprising a shifting clutch T for coupling the idler gear of the transmission-internal gear set G1 with the idler gear of the gear step GK.

The transmission ratio $i_{GK}$ of the gear step GK preferably corresponds to the transmission ratio $i_{G1}$ of the gear set G1 that can be coupled by means of the shifting clutch T of the coupling device$_{GK}$=i$_{G1}$) since the effective clutch transmission ratio i$_K$ between the first input shaft GE1 and the second input shaft GE2 is then equal to one (i$_K$=i$_{G1}$/i$_{GK}$=1) when the shifting clutch T is engaged.

In the underlying double clutch transmission (as shown in FIG. 14), when, in addition to the aforementioned features, the idler gear and the gear clutch B of the gear set G4 allocated to the second input shaft GE2 and disposed axially adjacent to the outer-most gear set R on the gear-side end of the second input shaft GE2 are also disposed on the output shaft GA, the coupling device can alternatively also comprise the remaining gear set (G4) of the gear sets G4, R, both allocated to the second input shaft GE2 and a shifting clutch U for coupling the idler gear of the transmission-internal gear set G1 with the idler gear of the remaining gear set G4. In this case, the advantage of saving a separate gear step GK counteracts the possible disadvantage of a clutch transmission ratio i$_K$ between the two input shafts GE1, GE2 that is not equal to one (i$_K$≠1).

In the two aforementioned embodiments of the manual transmission (according to FIGS. 6 and 7), in order to simplify the control mechanism, it is preferably provided that the shifting clutch (T, U) of the respective coupling device be integrated with the gear clutch D of the transmission-internal gear set G1 in a common shift set (S2b, S2c), by means of which the idler gear of the transmission-internal gear set G1 is coupled with the idler gear of the gear step GK or of the remaining gear set (G4) of the gear sets G4, R, both allocated to the second input shaft GE2 in a rotationally fixed manner in a first shift position, is decoupled in a neutral position, and is coupled with the output shaft GA in a rotationally fixed manner in a second shift position.

In the underlying double clutch transmission (as shown in FIG. 15), when the gear sets (G1-G7, R) are each disposed between one of the two input shafts GE1, GE2 and one of two countershafts VG1, VG2, each drivingly connected with the output shaft GA by means of an output constant AK1, AK2, and at least the idler gears and the allocated gear clutches C, D of the gear sets R, G6, both allocated to the second input shaft GE2 and a countershaft (VG2) of both countershafts VG1, VG2 and disposed on the gear-side end of the second input shaft GE2, are disposed on the respective countershaft VG2, the coupling device preferably comprises a gear step GK*, which comprises an idler gear rotatably mounted on the respective countershaft VG2 and a fixed gear disposed on the first input shaft GE1 in a rotationally fixed manner, that coupling device also comprising a shifting clutch X for coupling the idler gear of the remaining gear set (G6) of the gear sets R, G6 both allocated to the second input shaft GE2 with the idler gear of the gear step GK*.

In this case as well, the transmission ratio i$_{GK}$* of the gear step GK* preferably corresponds to the transmission ratio i$_{G6}$ of the gear set G6 that can be coupled by means of the shifting clutch X of the coupling device (i$_{GK}$*=i$_{G6}$), so that the effective clutch transmission ratio i$_K$ between the first input shaft GE1 and the second input shaft GE2 is equal to one (i$_K$=i$_{G6}$/i$_{GK}$*=1) when the shifting clutch X is engaged.

In the underlying double clutch transmission (as shown in FIG. 15), when in addition to the aforementioned features, the idler gear and the allocated gear clutch B of the transmission-internal gear set G7 allocated to the first input shaft GE1 and disposed axially adjacent to the gear-side end of the second input shaft GE2 are also disposed on the respective countershaft VG2, the coupling device can alternatively also comprise the transmission-internal gear set G7 and a shifting clutch Y for coupling the idler gear of the remaining gear set (G6) of the two gear sets R, G6 with the idler gear of the transmission-internal gear set G7. In this case as well, the advantage of saving a separate gear step GK* counteracts the possible disadvantage of a clutch transmission ratio i$_K$ between the two input shafts GE1, GE2 that is not equal to one (i$_K$≠1).

In the two aforementioned embodiments of the manual transmission (according to FIGS. 8 and 9), in order to simplify the control mechanism, it is preferably provided that the shifting clutch (X, Y) of the respective coupling device be integrated with the gear clutch D of the remaining gear set (G6) of the gear sets R, G6 both allocated to the second input shaft GE2 in a common shift set (S2f, S2g), by means of which the idler gear of the respective gear set G6 is coupled with the idler gear of the gear step GK* or of the transmission-internal gear set G7 allocated to the first input shaft GE1 in a rotationally fixed manner in a first shift position, is decoupled in a neutral position, and is coupled with the respective countershaft VG2 in a rotationally fixed manner in a second shift position.

In the aforementioned embodiments of the hybrid drive, the first input shaft can be connected in each case with the drive shaft of the internal combustion engine by means of a friction clutch K1.

It is also possible, however, that the first input shaft can be connected in each case with the drive shaft of the internal combustion engine by mans of a more robust and more cost-effective dog clutch, since that dog clutch can be synchronized by means of an electric machine when the shifting clutch is engaged.

However the first input shaft can also be directly connected with the drive shaft of the internal combustion engine in a rotationally fixed manner and thus the respective separator clutch can be eliminated. Although the gear sets (G1, G3, G5; G2, G4, G6) allocated to the first input shaft are hereby unavailable for purely electric vehicle operation, that is, for actuation using only the electric machine, this does not present a substantial functional limitation due to the larger usable speed range of an electric machine as compared to an internal combustion engine.

In the aforementioned embodiments of the hybrid drive, the electric machine can be disposed, in each case, coaxially over the first input shaft, and the rotor of the electric machine can be directly connected in a rotationally fixed manner with the second input shaft.

In order to be able to use a less powerful and correspondingly more compact and lighter electric machine, it can also be provided that the electric machine is disposed adjacent to the first input shaft and parallel to the axis, and the rotor of the electric machine is drivingly connected with the second input shaft by means of an input transmission stage KE having a transmission ratio i$_{KE}$ greater than 1 (i$_{KE}$>1.0).

Alternatively, for the same purpose, it may be provided that the electric machine is disposed coaxially over the first input shaft, and the rotor of the electric machine can be drivingly connected with the second input shaft GE2 by means of an input transmission stage KE' designed as a planetary gear assembly having a transmission ratio i$_{KE}$' greater than one (i$_{KE}$'>1.0).

BRIEF DESCRIPTION OF THE DRAWINGS

To illustrate the invention, a drawing having example embodiments follows the description. Shown are.

DETAILED DESCRIPTION OF THE PREFERRED EMBODIMENTS

Figure 10:
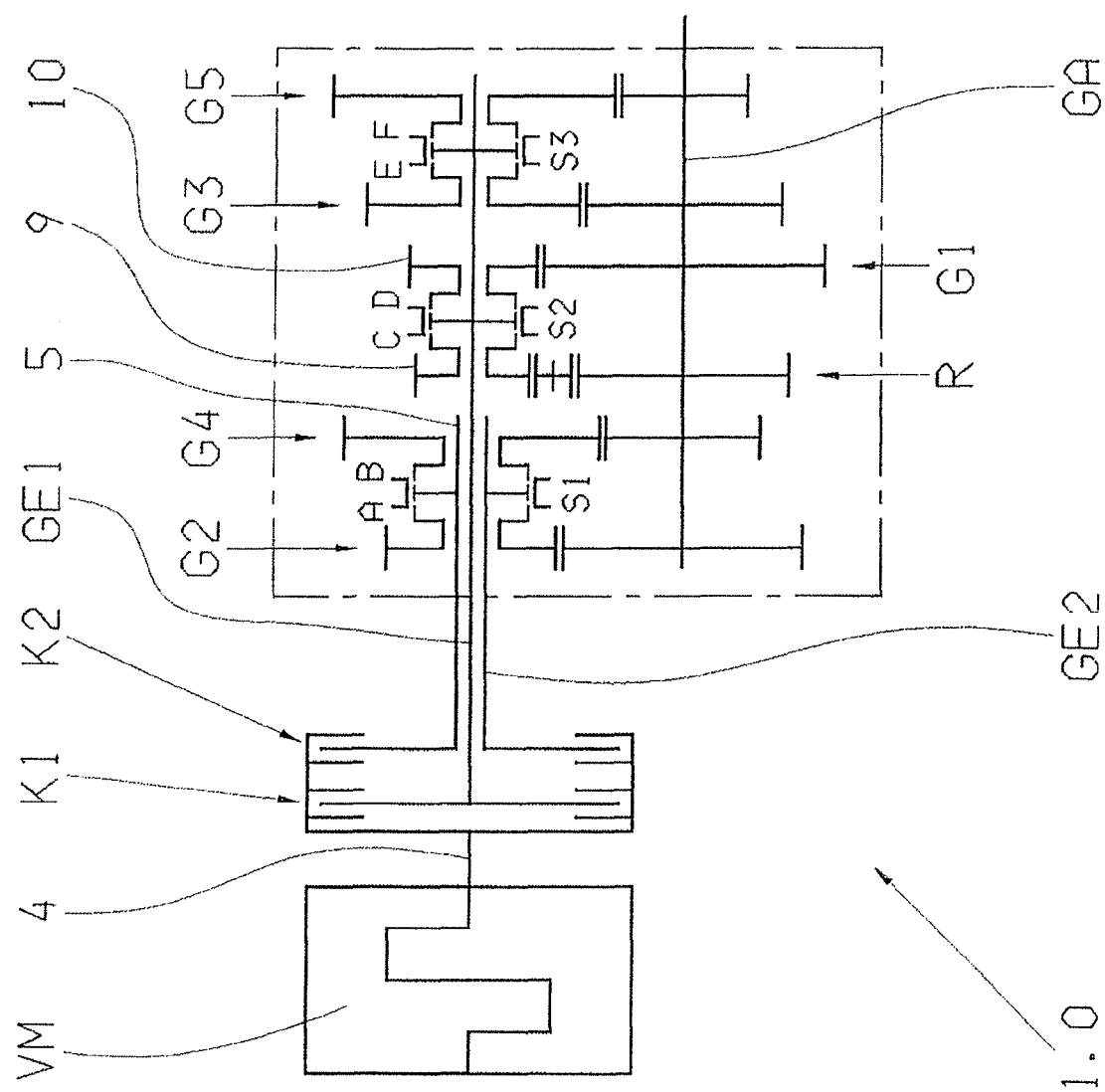

FIG. 10 is a diagram of a known double clutch transmission 1.0, from which a manual transmission 1.1 of a hybrid drive 6.1, described below, is derived. The double clutch transmission 1.0 has two coaxial input shafts GE1, GE2 and a common output shaft GA. The first input shaft GE1 is centrally disposed within the second input shaft GE2, which is designed as a hollow shaft. Both input shafts GE1, GE2 can be connected on the input side with the drive shaft 4 of an internal combustion engine VM, in each case by means of an allocated friction clutch K1, K2. On the output side, both input shafts GE1, GE2 can each be drivingly connected with the output shaft GA by means of multiple selectively shiftable gear sets R, G1, G3, G5 or G2, G4 respectively.

In the present case, the reverse gear set R of the reverse gear and the gear sets G1, G3, G5 of the odd forward gears are allocated to the first input shaft GE1. The gear sets G2, G4 of the even forward gears are allocated to the second input shaft GE2. The idler gears and the gear clutches A, B, C, D, E and F of the gear sets R, G1, G3, G5 or G2, G4 respectively are each disposed on the allocated input shaft GE1, GE2, while the respective fixed gears are each disposed in a rotationally fixed manner on the output shaft GA. The gear clutches A to F are each combined in pairs in a common shift set S1, S2, S3. Thus, the gear clutches A and B of the gear sets G2, G4 of the second and of the fourth forward gear are disposed in a first shift set S1, the gear clutches C and D of the reverse gear set R of the reverse gear and of the gear set G1 of the first forward gear are disposed in a second shift set S2, and the gear clutches E and F of the gear sets G3, G5 of the third and of the fifth forward gear are disposed in a third shift set S3.

For the manual transmission 1.1 of a hybrid drives 6.1, 6.2, 6.3 described below according to FIGS. 1 to 3, it is important to note that the reverse gear set R immediately axially adjacent to the gear-side end 5 of the second input shaft GE2 and the gear set G1 disposed axially adjacent thereto are allocated to the first input shaft GE1, and that the idler gears 9, 10 as well as the allocated gear clutches C, D of these gear sets R, G1 are disposed on the first input shaft GE1.

Figure 1:
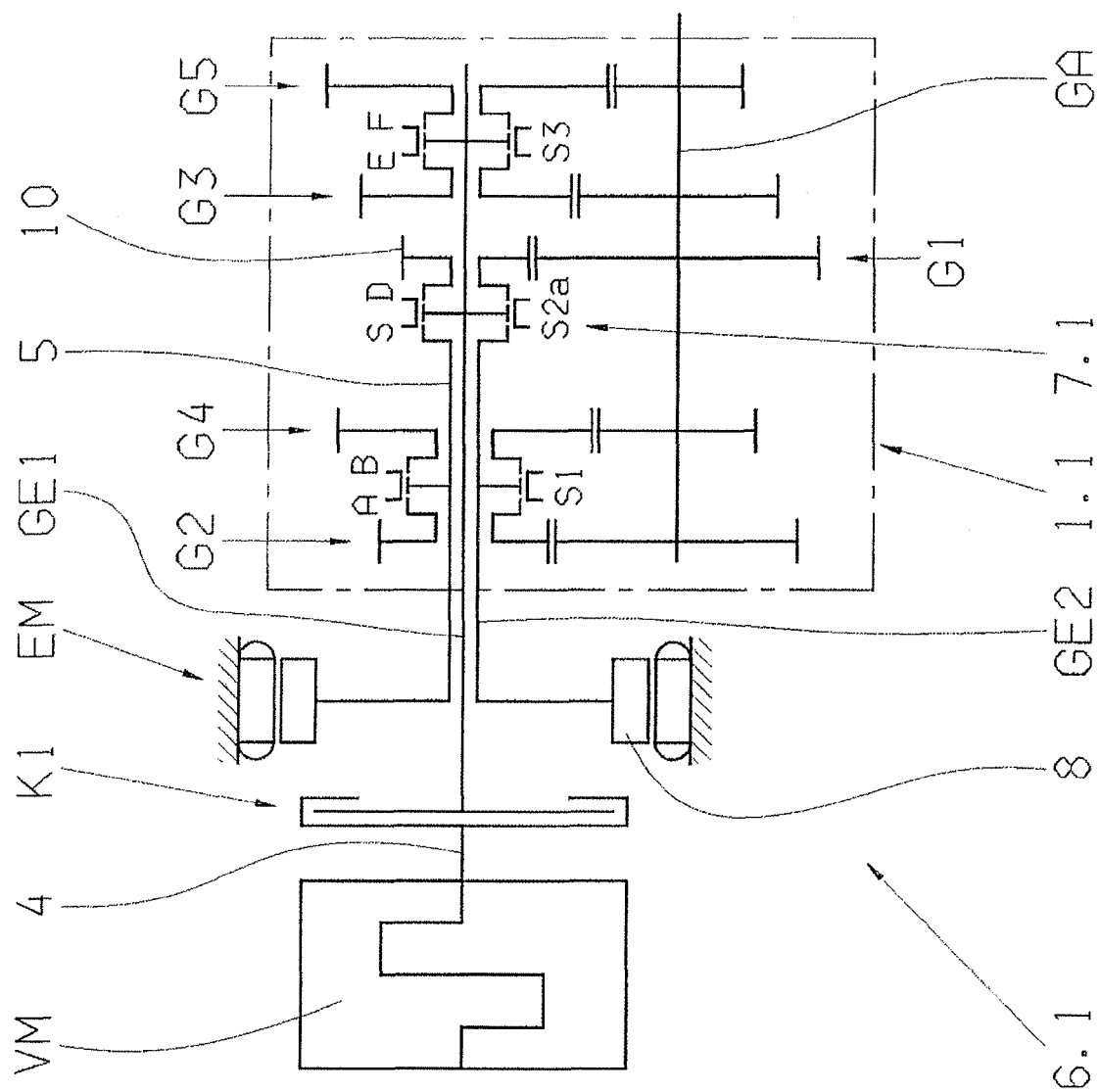
FIG. 1 a hybrid drive of a motor vehicle having a manual transmission, which is derived from a double clutch transmission according to FIG. 10 or FIG. 13, FIG. 2 a first refinement of the hybrid drive according to FIG. 1, FIG. 3 a second refinement of the hybrid drive according to FIG. 1, FIG. 4 a hybrid drive of a motor vehicle having a first embodiment of a manual transmission, which is derived from a double clutch transmission according to FIG. 11 or FIG. 14, FIG. 5 a hybrid drive of a motor vehicle having a second embodiment of a manual transmission, which is derived from a double clutch transmission according to FIG. 11 or FIG. 14, FIG. 6 a hybrid drive of a motor vehicle having a first embodiment of a manual transmission, which is derived from a double clutch transmission according to FIG. 12, FIG. 7 a hybrid drive of a motor vehicle having a second embodiment of a manual transmission, which is derived from a double clutch transmission according to FIG. 12, FIG. 8 a hybrid drive of a motor vehicle having a first embodiment of a manual transmission, which is derived from a double clutch transmission according to FIG. 15, FIG. 9 a hybrid drive of a motor vehicle having a second embodiment of a manual transmission, which is derived from a double clutch transmission according to FIG. 15, FIG. 10 a first double clutch transmission, FIG. 11 a second double clutch transmission, FIG. 12 a third double clutch transmission, FIG. 13 a fourth double clutch transmission, FIG. 14 a fifth double clutch transmission, and FIG. 15 a sixth double clutch transmission.

Based on the double clutch transmission 1.0 according to FIG. 10, a manual transmission 1.1 of a hybrid drives 6.1 according to FIG. 1 is thereby created such that, instead of the reverse gear set R of the reverse gear and of the allocated gear clutch C, a coupling device 7.1 is provided, by means of which the two input shafts GE1, GE2 can be drivingly connected with one another. In the present case, the coupling device 7.1 comprises a shifting clutch S, disposed on the first input shaft GE1 instead of the gear clutch C of the reverse gear, by means of which shifting clutch S, the first input shaft GE1 can be directly coupled with the gear-side end 5 of the second input shaft GE2. The shifting clutch S is integrated with the gear clutch D of the gear set G1 of the first forward gear in a common shift set S2a, by means of which the first input shaft GE1 is coupled with the gear-side end 5 of the second input shaft GE2 in a rotationally fixed manner in a first shift position, is decoupled in a neutral position, and is coupled with the idler gear 10 of the gear set G1 of the first forward gear in a rotationally fixed manner in a second shift position.

In the hybrid drive 6.1 according to FIG. 1, the first input shaft GE1 can be connected with the drive shaft 4 of the internal combustion engine VM on the input side by means of a first friction clutch K1. The second input shaft GE2 is directly connected on the input side in a rotationally fixed manner with the rotor 8 of an electric machine, which can be operated as a motor and as a generator EM, and which is disposed coaxially above the first input shaft GE1. The reverse gear set R of the reverse gear present in the underlying double clutch transmission 1.0 is omitted entirely in the manual transmission 1.1, which is possible without any problem since a reverse start and reverse-maneuvering are made possible, for example, by means of the gear set G2 of the second forward gear in conjunction with a reverse in rotation of the electric machine EM. Accordingly, with only minor changes, the manual transmission 1.1 of the hybrid drive 6.1 according to FIG. 1 can be derived from the double clutch transmission 1.0 according to FIG. 10 in a manner that does not require additional installation space, and without substantial functional limitations, and can be manufactured in a correspondingly cost-effective manner.

Figure 13:
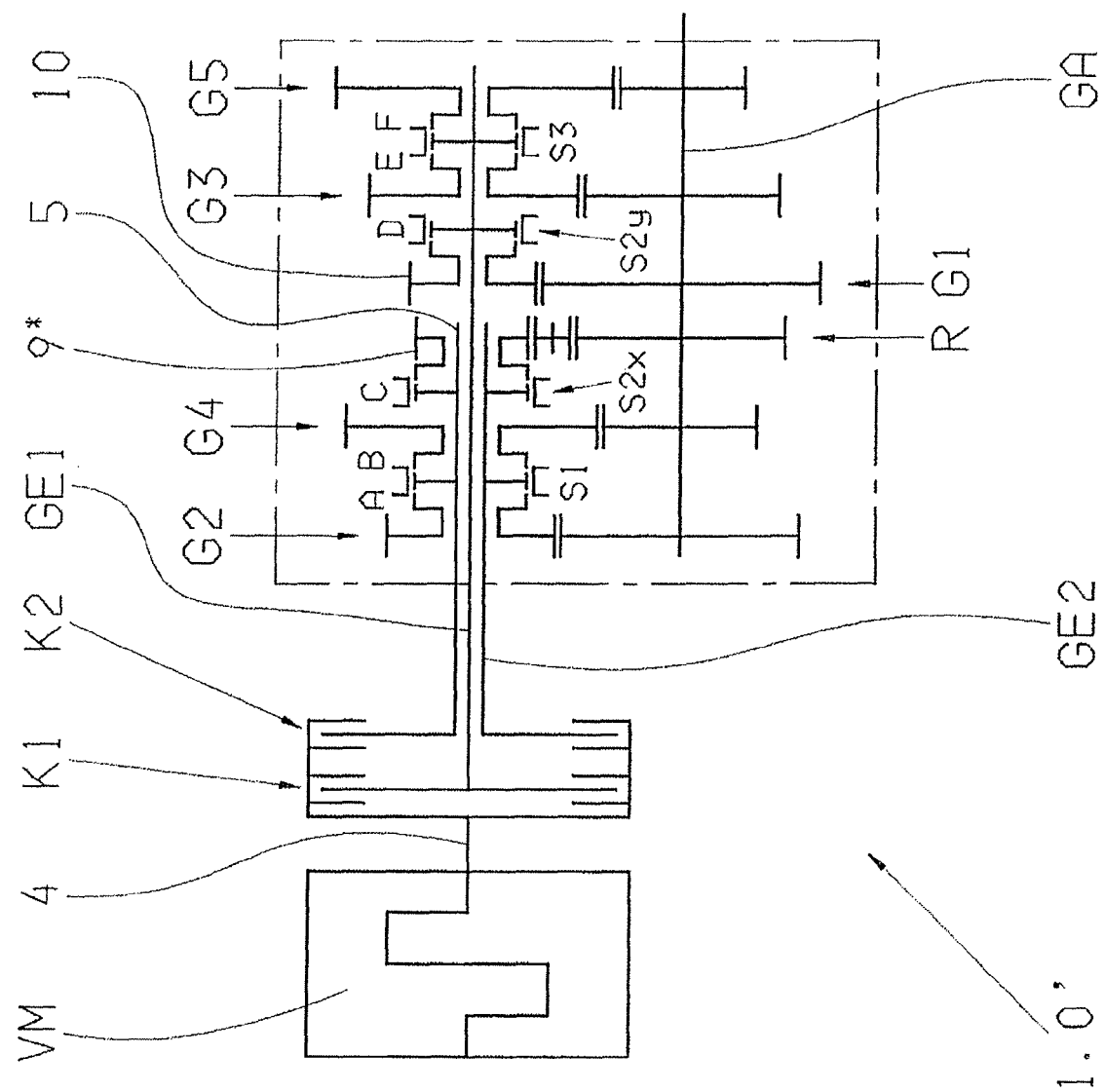

The same manual transmission 1.1 of the hybrid drive 6.1 according to FIG. 1 can also be derived form a known double clutch transmission 1.0' according to FIG. 13, which differs from the double clutch transmission 1.0 according to FIG. 10 having the same axial arrangement of the gear sets G1 to G5 and R in that the reverse gear set R is allocated to the second input shaft GE2. In this double clutch transmission 1.0', the reverse gear set R of the reverse gear is disposed on the gear-side end of the second input shaft GE2, while the gear set G1 of the first forward gear continues to be allocated to the first input shaft GE1 and is now axially adjacent to the gear-side end of the second input shaft GE2. Accordingly, the idler gear 9* and the allocated gear clutch C of the reverse gear set R are disposed on the second input shaft GE2, wherein the gear clutch C is a component of a separate shift set S2x, which has a shift position, in which the idler gear 9* is coupled with the second input shaft GE2, and a neutral position, in which the idler gear 9* is decoupled. The idler gear 10 and the allocated gear clutch D of the gear set G1 of the first forward gear are disposed on the first input shaft GE1, as in the case of the double clutch transmission 1.0 according to FIG. 10. The gear clutch D is now a component of a separate shift set S2y, however, which has a shift position, in which the idler gear 10 is coupled with the first input shaft GE1, and a neutral position, in which the idler gear 10 is decoupled.

Figure 2:
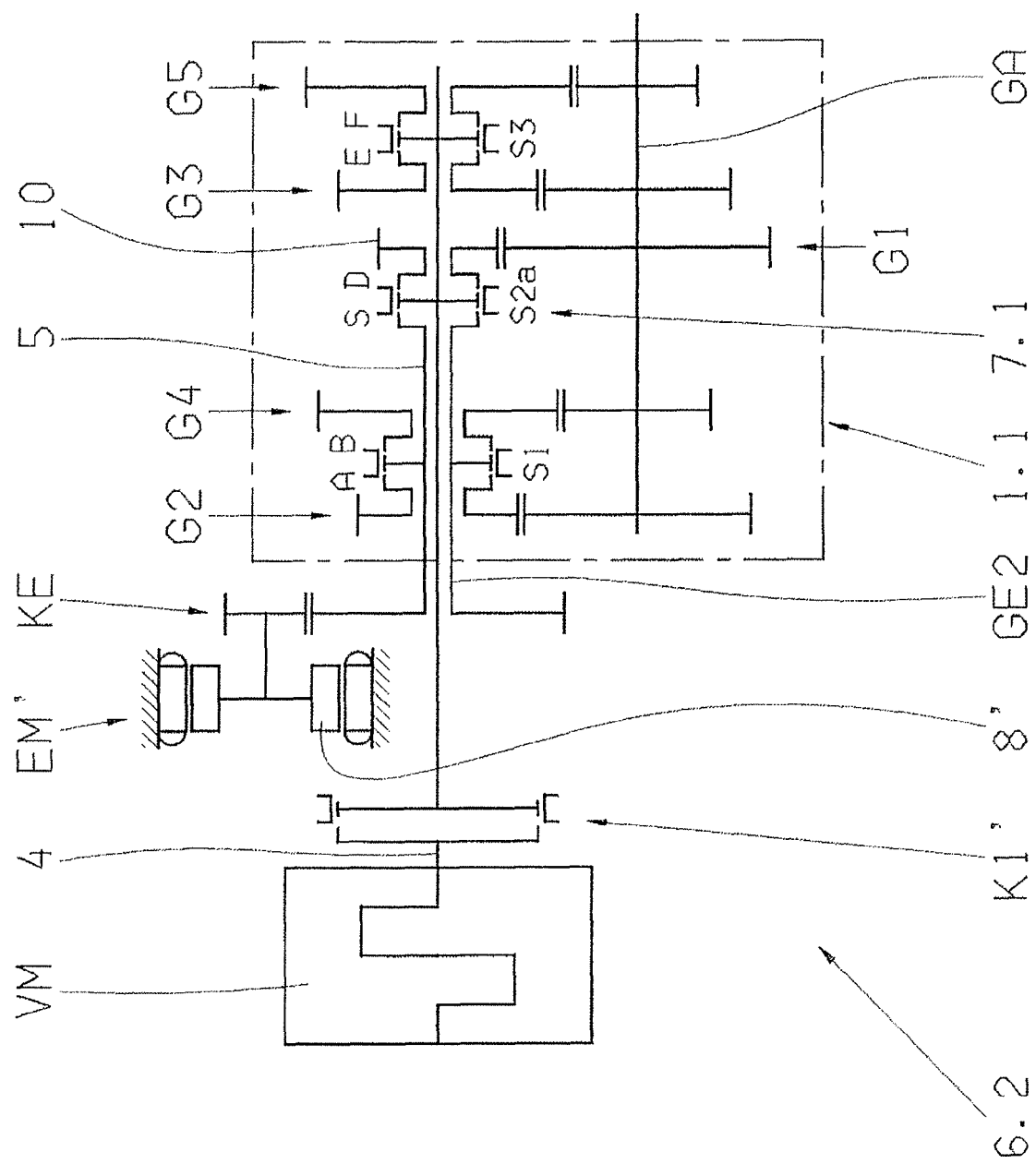
Figure 3:
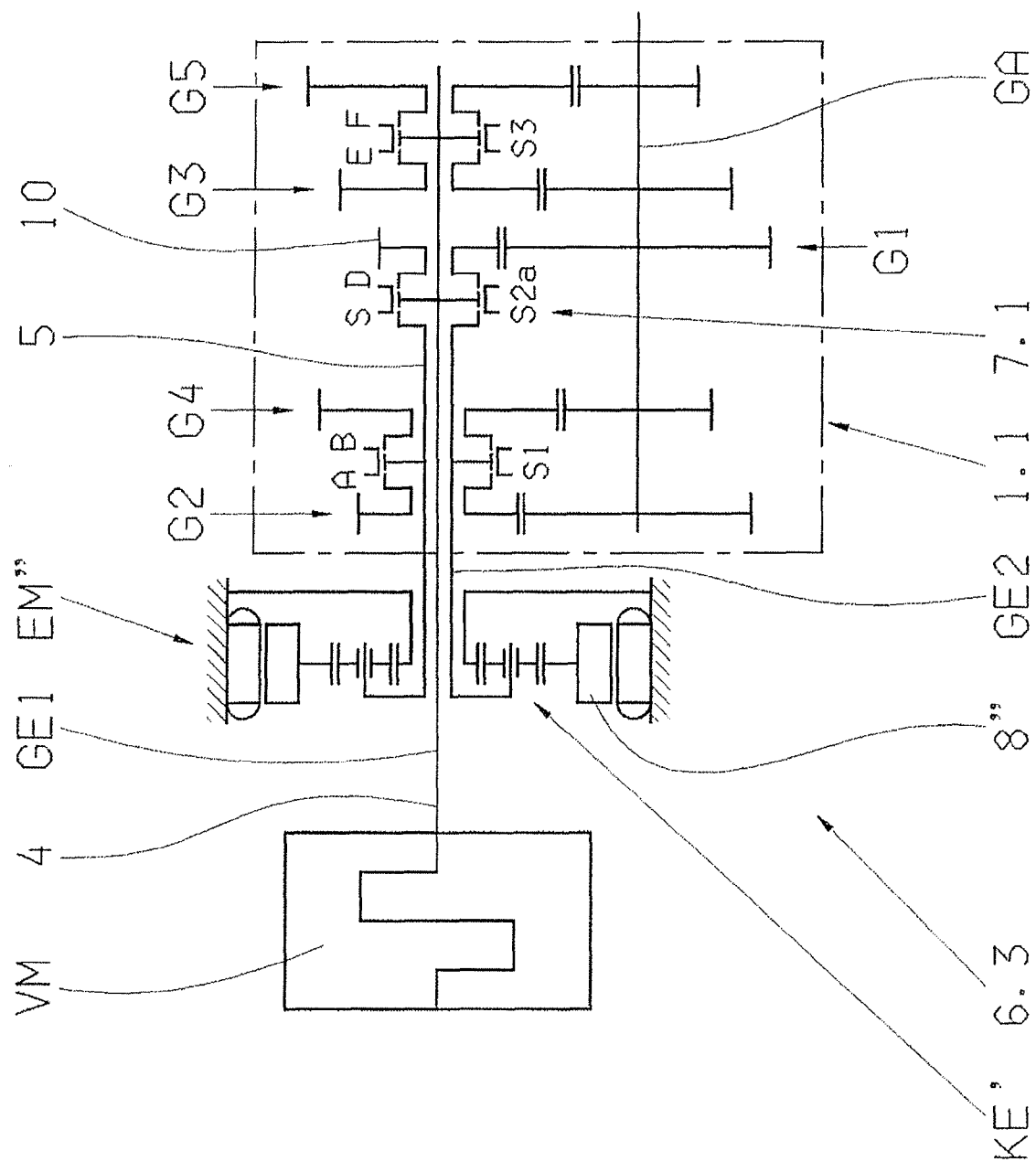

By way of example, the refinements of the hybrid drive 6.1 according to FIG. 1 shown in FIG. 2 and FIG. 3 have design features, which can be used in any combination and independent of one another in conjunction with all of the manual transmissions 1.1; 2.1, 2.2; 3.1, 3.2, 3.3, 3.4 described above, as well as with similarly designed manual transmissions.

In the embodiment of the hybrid drive 6.2 according to FIG. 2, the first input shaft GE1 can be connected on the input side with the drive shaft 4 of the internal combustion engine VM by means of an unsynchronized dog clutch K1'. A dog clutch K1' design is more cost-effective than a friction clutch K1 and therefore possible, because this dog clutch can be synchronized by means of the electric machine EM' when the shifting clutch S is engaged. As also illustrated by way of example in FIG. 2, the electric machine EM' can also be disposed adjacent to the first input shaft GE1 and parallel to the axis, and the rotor 8' of the electric machine EM' can be drivingly connected with the second input shaft GE2 by means of an existing input transmission stage KE designed as a spur gear pair, which advantageously has a transmission ratio $i_{KE}$ greater than one ($i_{KE}$>1.0). This allows for the electric machine EM' to be designed to be less powerful, and therefore correspondingly more compact and lighter.

In the embodiment of the hybrid drive 6.3 according to FIG. 3, the first input shaft GE1 is directly connected on the input side, that is, without a separator clutch K1, K1', with the drive shaft 4 of the internal combustion engine VM in a rotationally fixed manner, which embodies a further simplification and cost savings. The gear sets G1, G3, G5 allocated to the first input shaft GE1 are made unavailable thereby for purely electric vehicle operation, that is, for actuation using only the electric machine EM". This does not present a substantial functional limitation due to the larger available speed range of an electric machine EM" as compared to an internal combustion engine VM. As also shown by way of example in FIG. 3, the electric machine EM" can also be disposed coaxially over the first input shaft GE1. In addition, the rotor 8" of the electric machine EM" can be drivingly connected with the second input shaft GE2 by means of an input transmission stage KE' designed as a planetary gear assembly, which advantageously has a transmission ratio $i_{KE}'$ greater than one ($i_{KE}'$>1.0). In this case as well, the electric machine EM" can be designed to be less powerful and accordingly, more compact as well as lighter.

Figure 11:
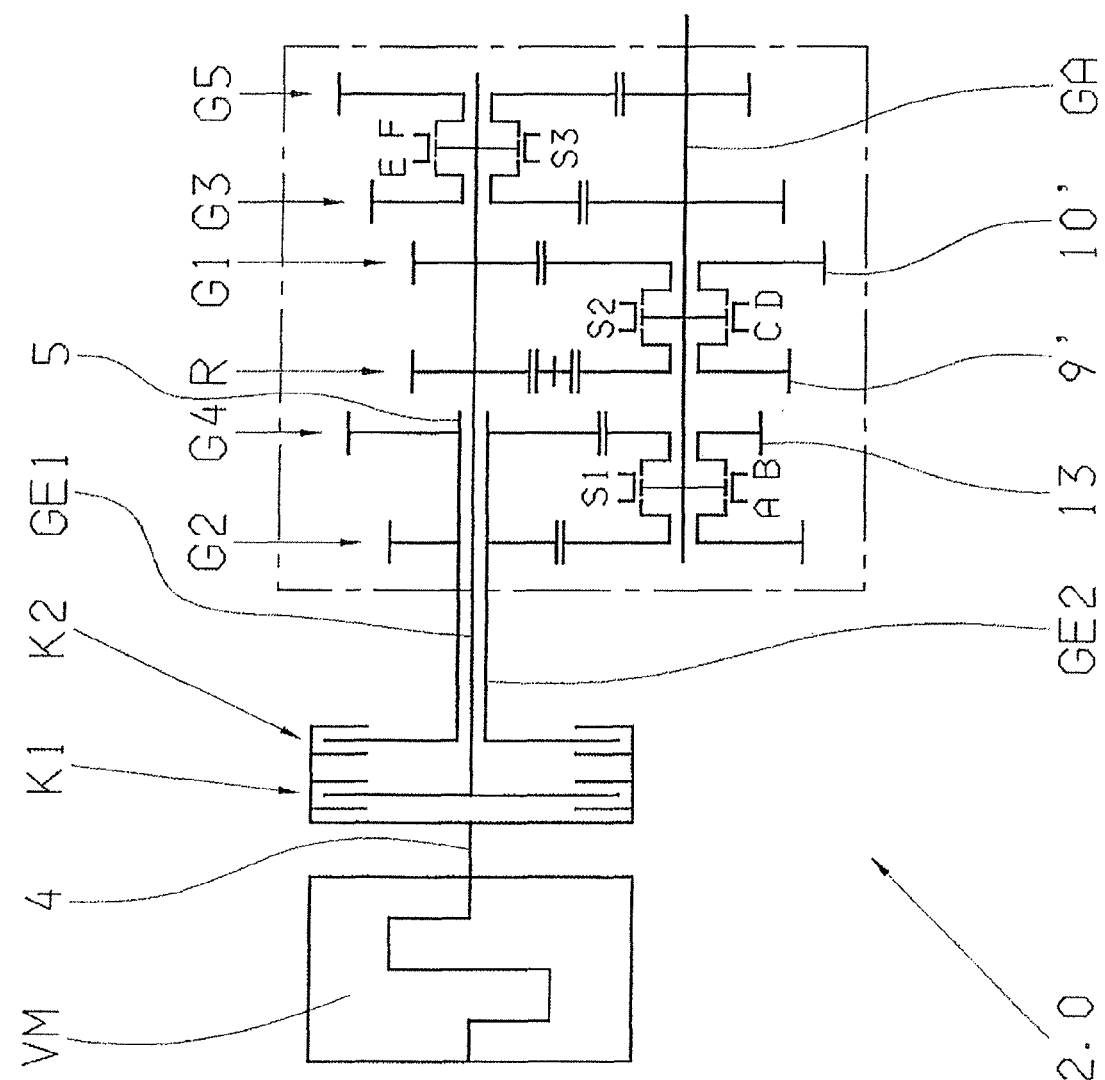

FIG. 11 shows a diagram of a known double clutch transmission 2.0 from which the two embodiments of a manual transmission 2.1, 2.2 of a hybrid drives 6.4, 6.5 described below are derived. The double clutch transmission 2.0 is largely identical in design to the double clutch transmission 1.0 according to FIG. 10. The essential difference is in the fact that the idler gears and the gear clutches A, B, C, D of the gear sets G2, G4 and R, G1 are now each disposed on the output shaft GA, and the respective fixed gears are each disposed in a rotationally fixed manner on the allocated input shaft GE2 or GE1 respectively. Accordingly, the two shift sets S1, S2, in which the gear clutches A, B of the gear sets G2, G4 of the second forward gear and of the fourth forward gear as well as the gear clutches C, D of the reverse gear set R of the reverse gear and of the gear set G1 of the first forward gear are combined, are now disposed on the output shaft GA.

For the embodiments of a manual transmission 2.1, 2.2 of a hybrid drives 6.4, 6.5 according to FIGS. 4 and 5 described below, it is important to note that the reverse gear set R, disposed immediately axially adjacent to the gear-side end 5 of the second input shaft GE2 and the axial gear set G1 disposed axially adjacent thereto, are allocated to the first input shaft GE1, and that the idler gears 9', 10' as well as the allocated gear clutches C, D of these gear sets R, G1 are disposed on the output shaft GA.

Figure 5:
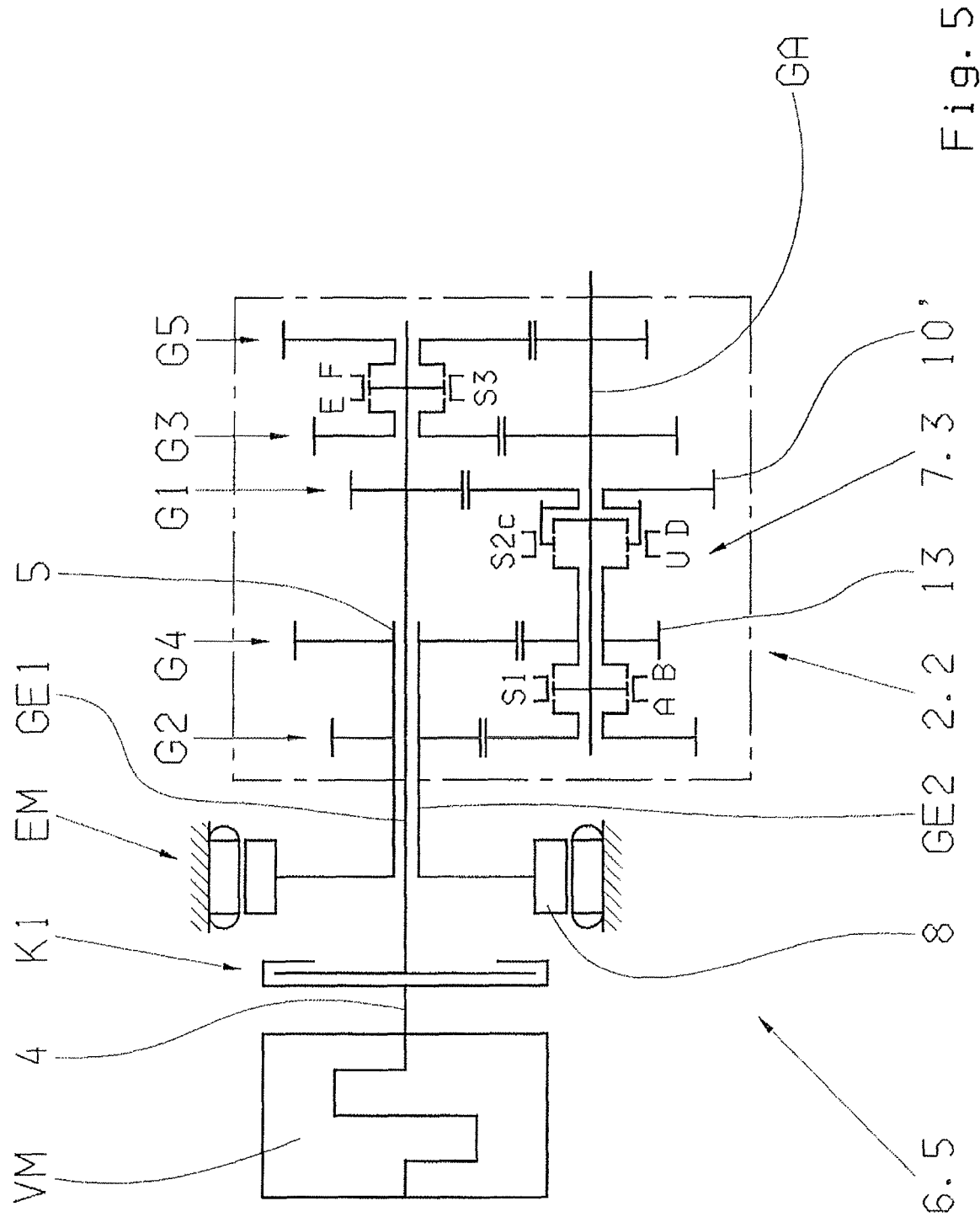

For the second embodiment of the manual transmission 2.2 according to FIG. 5, it is also important that the idler gear 13 and the allocated gear clutch B of the gear set G4 allocated to the second input shaft GE2 and disposed axially adjacent to the gear-side end 5 thereof are likewise disposed on the output shaft GA.

Figure 4:
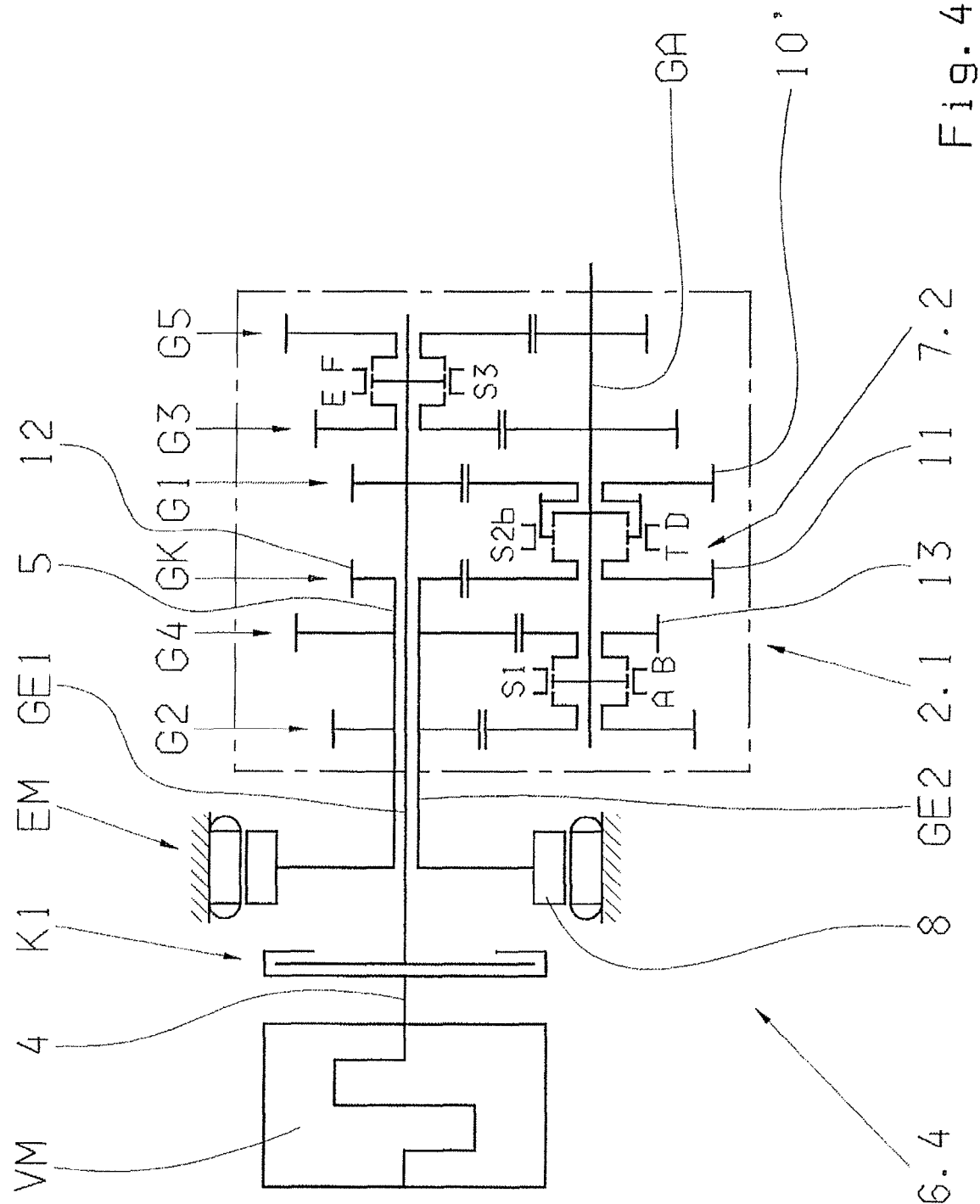

Based on the double clutch transmission 2.0 according to FIG. 11, a first embodiment of a manual transmission 2.1 of a hybrid drives 6.4 according to FIG. 4 is created such that, instead of the reverse gear set R of the reverse gear and of the allocated gear clutch C, a coupling device 7.2 is provided by means of which the two input shafts GE1, GE2 can be drivingly connected with one another. The coupling device 7.2 comprises a gear step GK having an idler gear 11 rotatably mounted on the output shaft GA and a fixed gear 12 disposed on the gear-side end 5 of the second input shaft GE2 in a rotationally fixed manner, and comprises a shifting clutch T, said gear step GK and shifting clutch T being disposed in the manual transmission 2.1 instead of the reverse gear set R as well as the allocated gear clutch C of the reverse gear of the underlying double clutch transmission 2.0 (FIG. 11).

The shifting clutch T of the gear step GK is integrated with the gear clutch D of the gear set G1 of the first forward gear in a common shift set S2b, by means of which the idler gear 10' of the gear set G1 of the first forward gear is coupled with the idler gear 11 of the gear step GK in a rotationally fixed manner in a first shift position, is decoupled in a neutral position, and is coupled with the output shaft GA in a rotationally fixed manner in a second shift position.

The effective transmission ratio $i_{GK}$ of the gear step GK between the output shaft GA and the second input shaft GE2 preferably corresponds to the transmission ratio $i_{G1}$ of the gear set G1 of the first forward gear ($i_{GK}=i_{G1}$), since the effective clutch transmission ratio $i_K$ between the first input shaft GE1 and the second input shaft GE2 is then equal to one ($i_K=i_{G1}/i_{GK}=1$) when the shifting clutch T is engaged.

A second embodiment of the manual transmission 2.2 of a hybrid drives 6.5 according to FIG. 5, derived from the double clutch transmission 2.0 according to FIG. 11, is largely identical to the manual transmission 2.1 according to FIG. 4. The essential difference is in the fact that the coupling device 7.3 now comprises the axially adjacent gear set G4 of the forward gear allocated to the second input shaft GE2 and a shifting clutch U, that is, instead of a separate gear step GK, the gear set G4 of the fourth forward gear is also used to couple the two input shafts GE1, GE2.

The shifting clutch U is thereby integrated with the gear clutch D of the gear set G1 of the first forward gear in a common shift set S2c, by means of which the idler gear 10' of the gear set G1 of the first forward gear is coupled with the idler gear 13 of the gear set G4 of the fourth forward gear in a rotationally fixed manner in a first shift position, is decoupled in a neutral position, and is coupled with the output shaft GA in a rotationally fixed manner in a second shift position. In this case, the advantage of saving a separate gear step GK counteracts the possible disadvantage of a clutch transmission ratio $i_K$ that is not equal to one ($i_K \neq 1$). The effective clutch transmission ratio $i_K$ between the first input shaft GE1 and the second input shaft GE2 when the shifting clutch U is engaged is obtained with the equation $i_K=i_{G1}/i_{G4}>1$ in the present embodiment of the manual transmission 2.2.

The manual transmissions 2.1, 2.2 of the hybrid drives 6.4, 6.5 according to FIGS. 4 and 5 are each also derived from the double clutch transmission 2.0 according to FIG. 11 with minor changes in a manner that requires no additional installation space and without substantial functional limitations, and can be manufactured in a correspondingly cost-effective manner.

Figure 14:
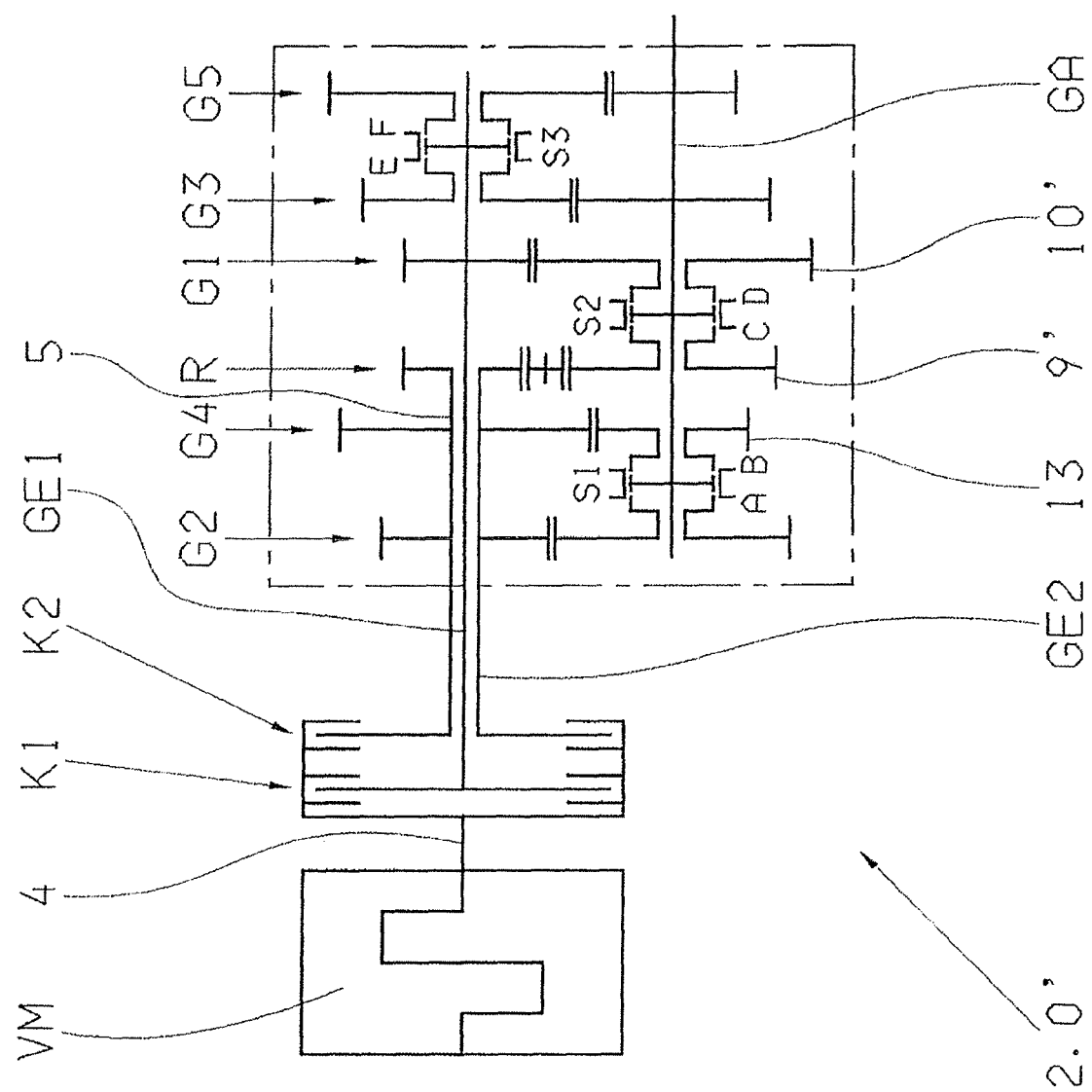

The manual transmission 2.1 of the hybrid drive 6.4 according to FIG. 4 and the manual transmission 2.2 of the hybrid drive 6.5 according to FIG. 5 can also be derived from a known double clutch transmission 2.0' according to FIG. 14, which differs from the double clutch transmission 2.0 according to FIG. 11 having the same axial arrangement of the gear sets G1-G5, R in the allocation of the reverse gear set R to the second input shaft GE2. In this double clutch transmission 2.0', the reverse gear set R of the reverse gear is disposed on the gear-side end 5 of the second input shaft GE2, while the gear set G1 of the first forward gear continues to be allocated to the first input shaft GE1 and is now axially adjacent to the gear-side end of the second input shaft GE2. The idler gears 9', 10' and the gear clutches C, D of the reverse gear set R as well as of the gear set G1 of the first forward gear continue to be disposed on the output shaft GA, and the aforementioned gear clutches C, D are likewise combined in a common shift set S2.

Figure 12:
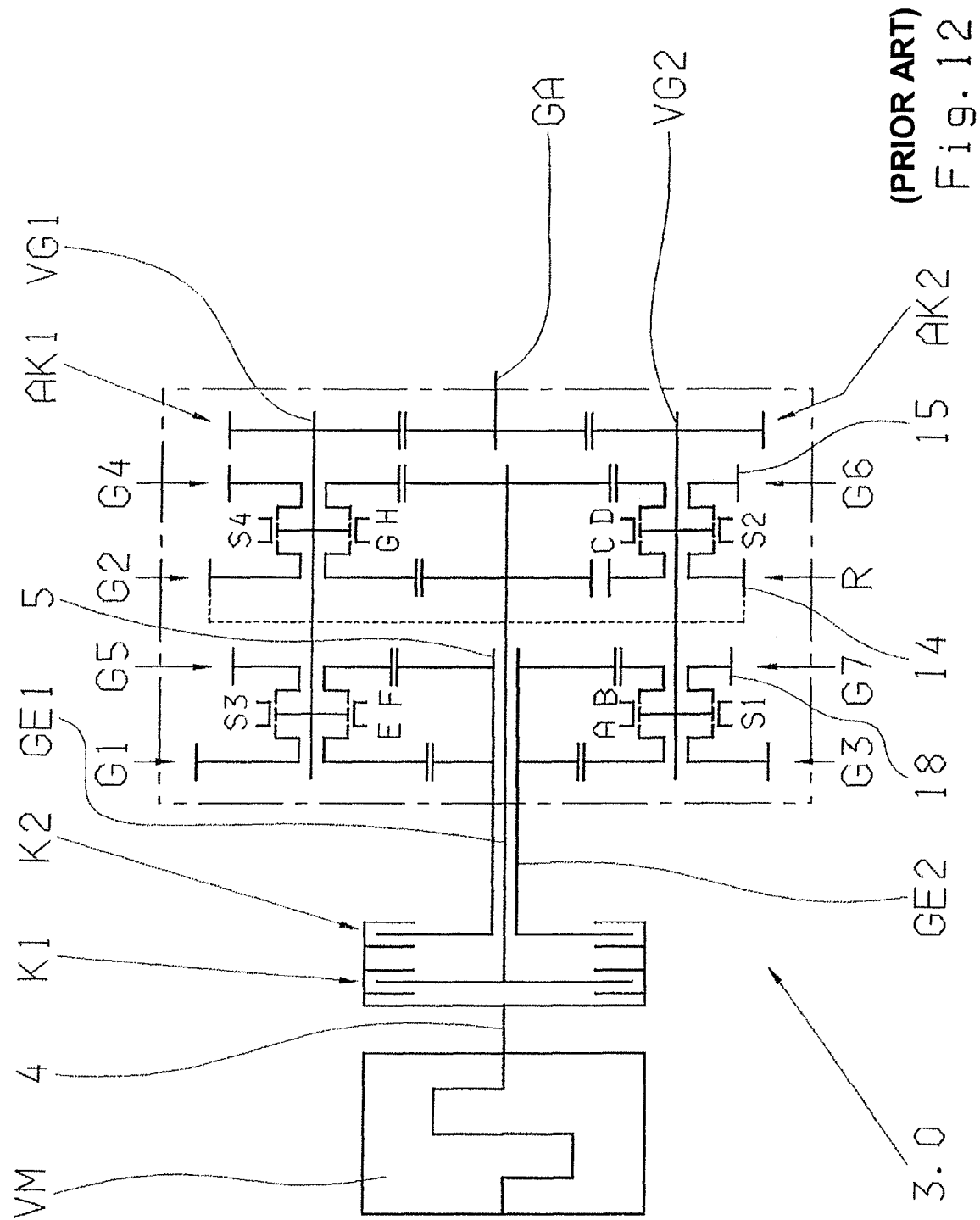

FIG. 12 shows a diagram of a known double clutch transmission 3.0 from which the two embodiments of a manual transmission 3.1, 3.2 of a hybrid drives 6.6, 6.7 described below are derived. The double clutch transmission 3.0 has two coaxial input shafts GE1, GE2 and a common output shaft GA. The first input shaft GE1 is centrally disposed within the second input shaft GE2, which is designed as a hollow shaft. Both input shafts GE1, GE2 can be connected on the input side with the drive shaft 4 of an internal combustion engine VM in each case by means of an allocated friction clutch K1, K2. On the output side, both input shafts GE1, GE2 can each be drivingly connected with a first countershaft VG1 and a second countershaft VG2 by means of multiple selectively shiftable gear sets R, G2, G4, G6 or G1, G3, G5, G7 respectively, said countershafts being drivingly connected with the output shaft GA in each case by means of an output constant AK1, AK2.

In the present case, the reverse gear set R of the reverse gear and the gear sets G2, G4, G6 of the even numbered forward gears are allocated to the first input shaft GE1, said gear sets being disposed in a common radial plane each using a common fixed gear. The reverse gear set R of the reverse gear comprises an idler gear 14 disposed on the second countershaft VG2 and the gear set G2 of the second forward gear disposed in the same radial plane between the first input shaft GE1 and the first countershaft VG1. The gear sets G1, G3, G5, G7 of the odd numbered forward gears are allocated to the second input shaft GE2, said gear sets being disposed in pairs in a common radial plane and each using a common fixed gear.

The idler gears and the gear clutches A to H of the gear sets R, G2, G4, G6 or G1, G3, G5, G7 respectively are each disposed on one of the two countershafts VG1, VG2, while the respective fixed gears are each disposed in a rotationally fixed manner in each case on the allocated input shaft GE1, GE2. The gear clutches A to H are each combined in pairs in a common shift set S1, S2, S3, S4. Thus the gear clutches A, B of the gear sets G3, G7 of the third and of the seventh forward gear are disposed in a first shift set S1, the gear clutches C, D of the reverse gear set R of the reverse gear and of the gear set G6 of the sixth forward gear are disposed in a second shift set S2, the gear clutches E, F of the gear sets G1, G5 of the first and of the fifth forward gear are disposed in a third shift set S3, and the gear clutches G, H of the gear sets G2, G4 of the second and of the fourth forward gear are disposed in a fourth shift set S4.

For the embodiments of a manual transmission 3.1, 3.2 of a hybrid drives 6.6, 6.7 according to FIGS. 6 and 7 described below, it is important to note that the reverse gear set R disposed immediately axially adjacent to the gear-side end 5 of the second input shaft GE2 and the axial gear set G6 disposed axially adjacent thereto are allocated to the first input shaft GE1, and that the idler gears 14, 15 as well as the allocated gear clutches C, D of these gear sets R, G6 are disposed on the second countershaft VG2. For the second embodiment of the manual transmission 3.2 according to FIG. 7, it is also important that the idler gear 18 and the allocated gear clutch B of the gear set G7 allocated to the second input shaft GE2 and disposed on the gear-side end 5 thereof are likewise disposed on the second countershaft VG2.

Figure 6:
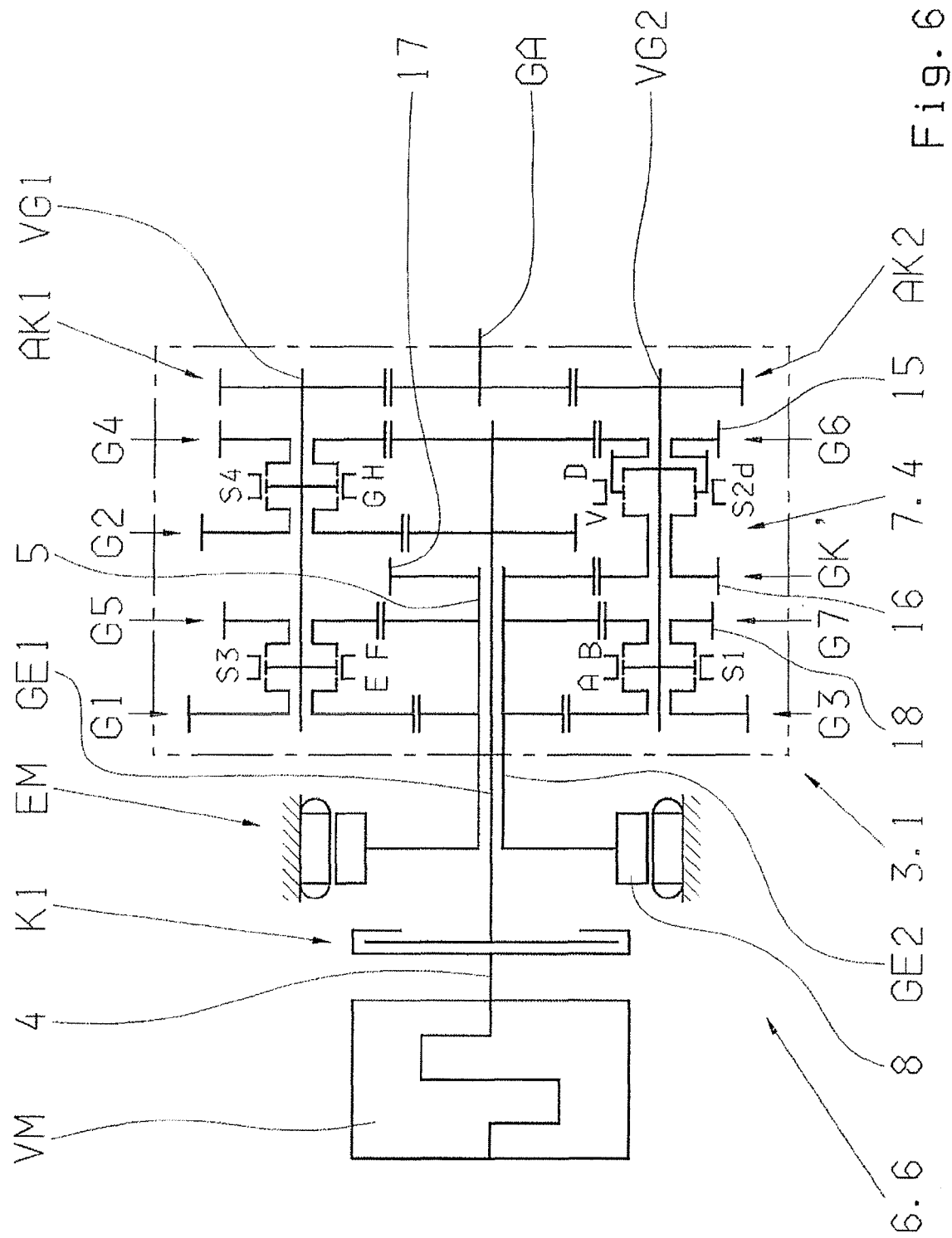

Based on the double clutch transmission 3.0 according to FIG. 12, a first embodiment of a manual transmission 3.1 of a hybrid drives 6.6 according to FIG. 6 is thereby created such that, instead of the reverse gear set R of the reverse gear and the allocated gear clutch C, a coupling device 7.4 is provided, by means of which the two input shafts GE1, GE2 can be drivingly connected with one another. The coupling device 7.4 according to FIG. 6 comprises a gear step GK' with an idler gear 16 rotatably mounted on the second countershaft VG2 and with a fixed gear 17 disposed on the gear-side end 5 of the second input shaft GE2 in a rotationally fixed manner, and with a shifting clutch V, which is disposed in the manual transmission 3.1 instead of the reverse gear set R and the allocated gear clutch C of the reverse gear of the underlying double clutch transmission 3.0 (FIG. 12).

The shifting clutch V of the gear step GK' is integrated with the gear clutch D of the gear set G6 of the sixth forward gear in a common shift set S2d, by means of which the idler gear 15 of the gear set G6 of the sixth forward gear is coupled with the idler gear 16 of the gear step GK' in a rotationally fixed manner in a first shift position, is decoupled in a neutral position, and is coupled with the second countershaft VG2 in a rotationally fixed manner in a second shift position.

The effective transmission ratio $i_{GK}'$ of the gear step GK' between the second countershaft VG2 and the second input shaft GE2 preferably corresponds to the transmission ratio $i_{G6}$ of the gear set G6 of the sixth forward gear ($i_{GK}'=i_{G6}$), since the effective clutch transmission ratio $i_K$ between the first input shaft GE1 and the second input shaft GE2 is then equal to one ($i_K=i_{G6}/i_{GK}'=1$) when the shifting clutch V is engaged.

Figure 7:
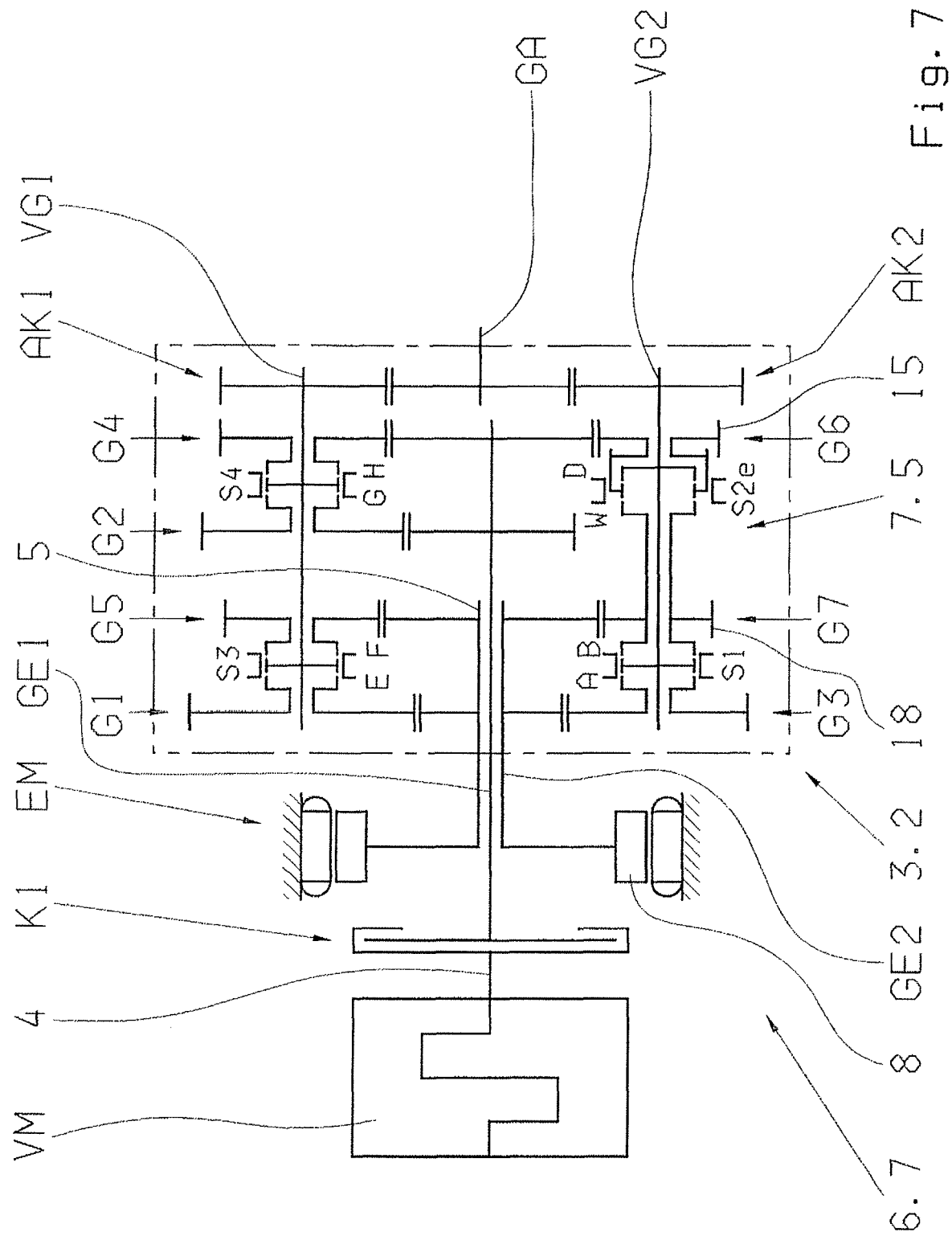

A second embodiment of the manual transmission 3.2 of a hybrid drives 6.7 according to FIG. 7, derived from the double clutch transmission 3.0 according to FIG. 12, is largely identical to the manual transmission 3.1 according to FIG. 6. The essential difference is in the fact that the coupling device 7.5 now comprises the axially adjacent gear set G7 of the seventh forward gear allocated to the second input shaft GE2 and a shifting clutch W, that is, that instead of a separate gear step GK', the gear set G7 of the seventh forward gear is also used to couple the input shafts GE1, GE2.

The shifting clutch W is integrated with the gear clutch D of the gear set G6 of the sixth forward gear in a common shift set S2e, by means of which the idler gear 15 of the gear set G6 of the sixth forward gear is coupled with the idler gear 18 of the gear set G7 of the seventh forward gear in a rotationally fixed manner in a first shift position, is decoupled in a neutral position, and is coupled with the second countershaft VG2 in a rotationally fixed manner in a second shift position. The advantage of eliminating a separate gear step GK' counteracts the possible disadvantage of a clutch transmission ratio $i_K$ that is not equal to one ($i_K \neq 1$). The effective clutch transmission ratio $i_K$ between the first input shaft GE1 and the second input shaft GE2 when the shifting clutch W is engaged is obtained with the equation $i_K = i_{G6}/i_{G7} > 1$ in the present embodiment of the manual transmission 3.2.

The manual transmissions 3.1, 3.2 of the hybrid drives 6.6, 6.7 according to FIGS. 6 and 7, which are also designed according to the basic principle of the invention, are also each derived from double clutch transmission 3.0 according to FIG. 12 with minimal changes in a manner that does not require additional installation space and without substantial functional limitations, and can be manufactured in a cost-effective manner.

Figure 15:
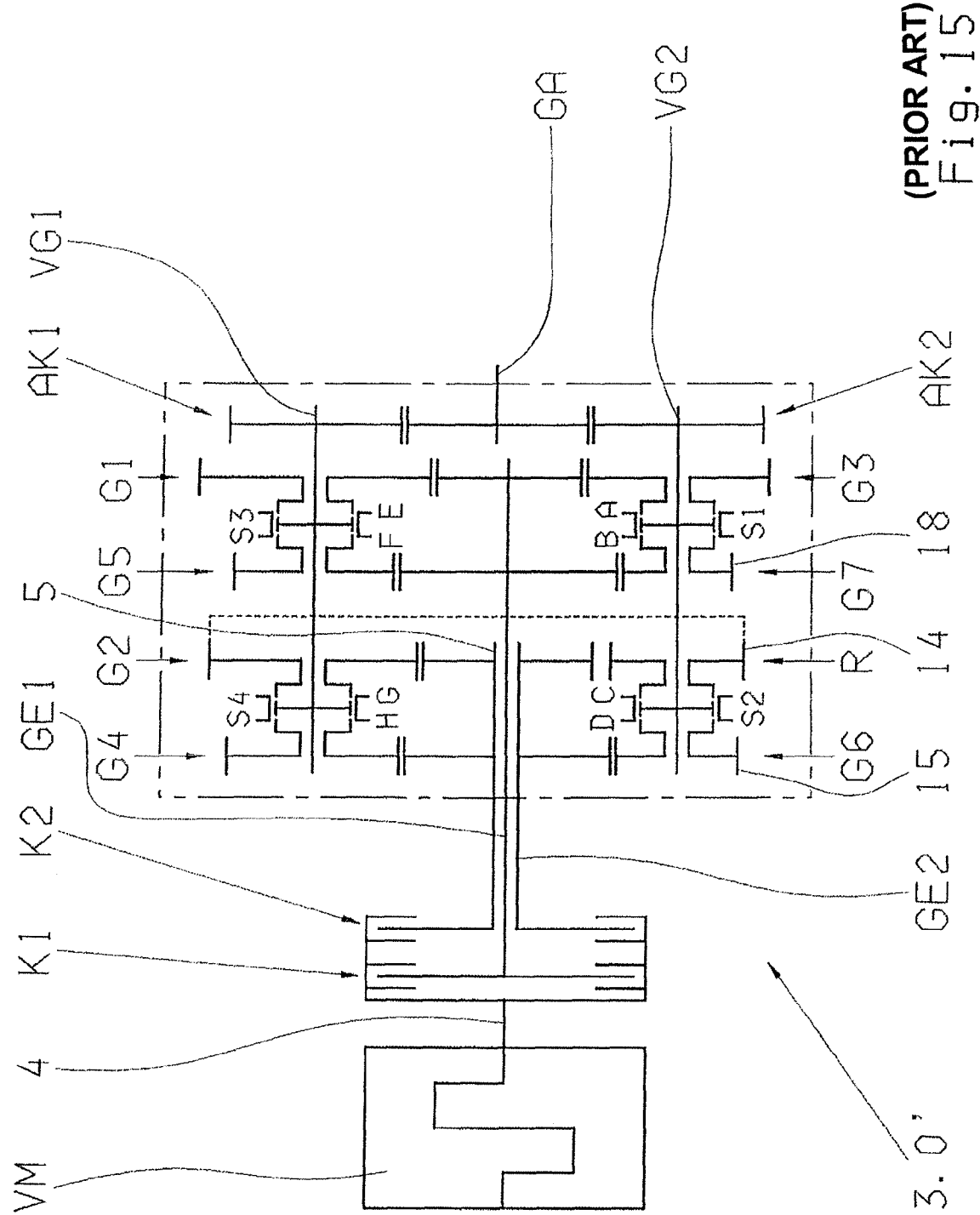

In a similar manner to that with the double clutch transmission 3.0 according to FIG. 12, two embodiments of a manual transmission 3.3, 3.4 of a hybrid drives 6.8, 6.9 described below can be derived from the known double clutch transmission 3.0' according to FIG. 15. The double clutch transmission 3.0' according to FIG. 15 is largely identical in design to the double clutch transmission 3.0 according to FIG. 12. It differs therefrom however in an axial arrangement of the gear sets G1 to G7 and R. Accordingly, the gear sets G1, G3, G5, G7 of the odd numbered forward gears are now allocated to the first input shaft GE1, and the gear sets G2, G4, G6, R of the even numbered forward gears as well as of the reverse gear are allocated to the second input shaft GE2.

For the embodiments of a manual transmission 3.3, 3.4 of a hybrid drives 6.8, 6.9 according to FIGS. 8 and 9 described below, it is important to note that the reverse gear set R, disposed immediately adjacent to the gear-side end 5 of the second input shaft GE2, and the gear set G6 of the sixth forward gear, disposed axially adjacent thereto, are allocated to the second input shaft GE2, and that the idler gears 14, 15, as well as the allocated gear clutches C, D of these gear sets R, G6, are disposed on the second countershaft VG2.

Figure 9:
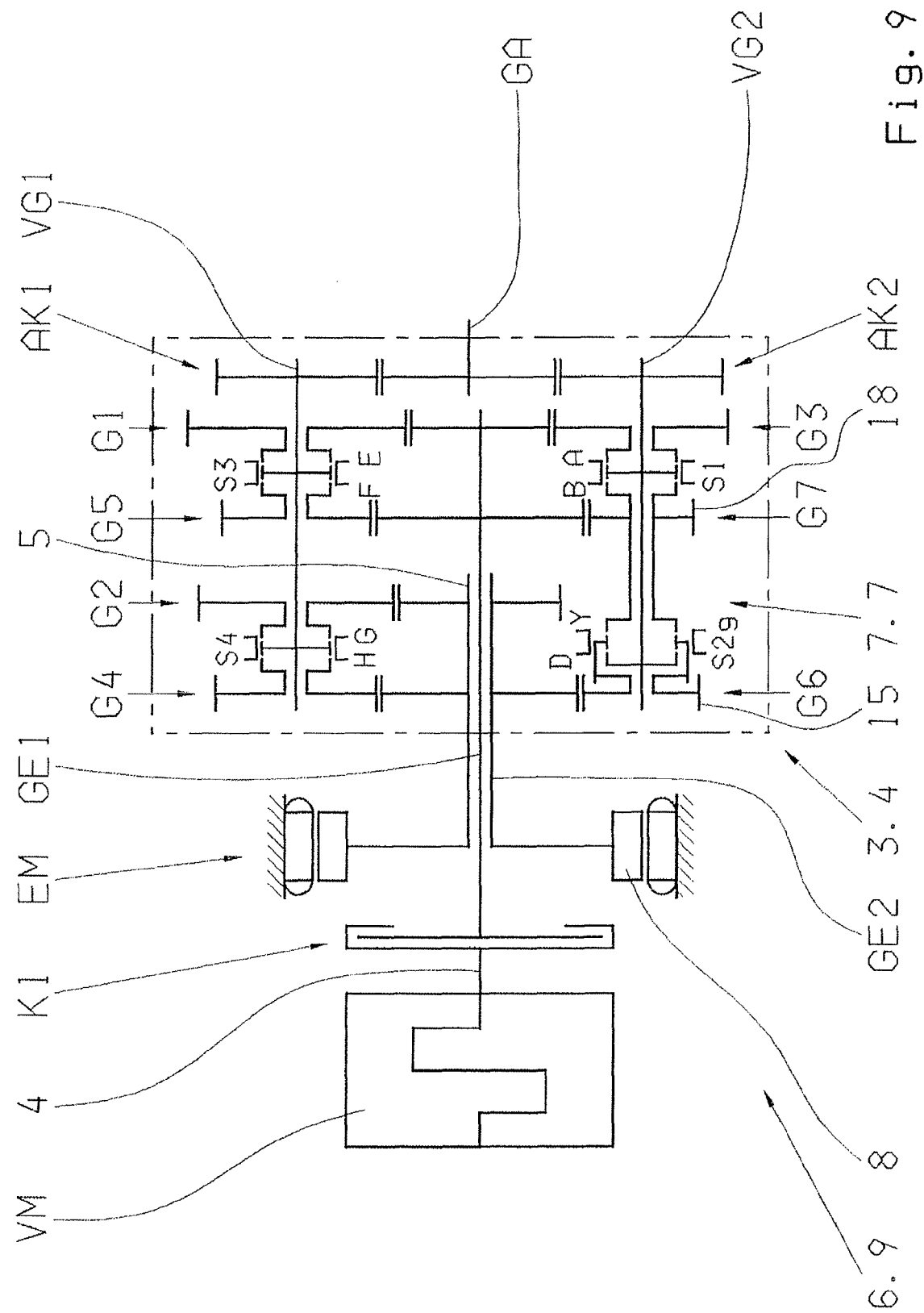

For the second embodiment of the manual transmission 3.4 according to FIG. 9, it is also important that the idler gear 18 and the allocated gear clutch B of the gear set G7 of the seventh forward gear allocated to the first input shaft GE1 and disposed axially adjacent to the gear-side end 5 of the second input shaft GE2 are likewise disposed on the second countershaft VG2.

Figure 8:
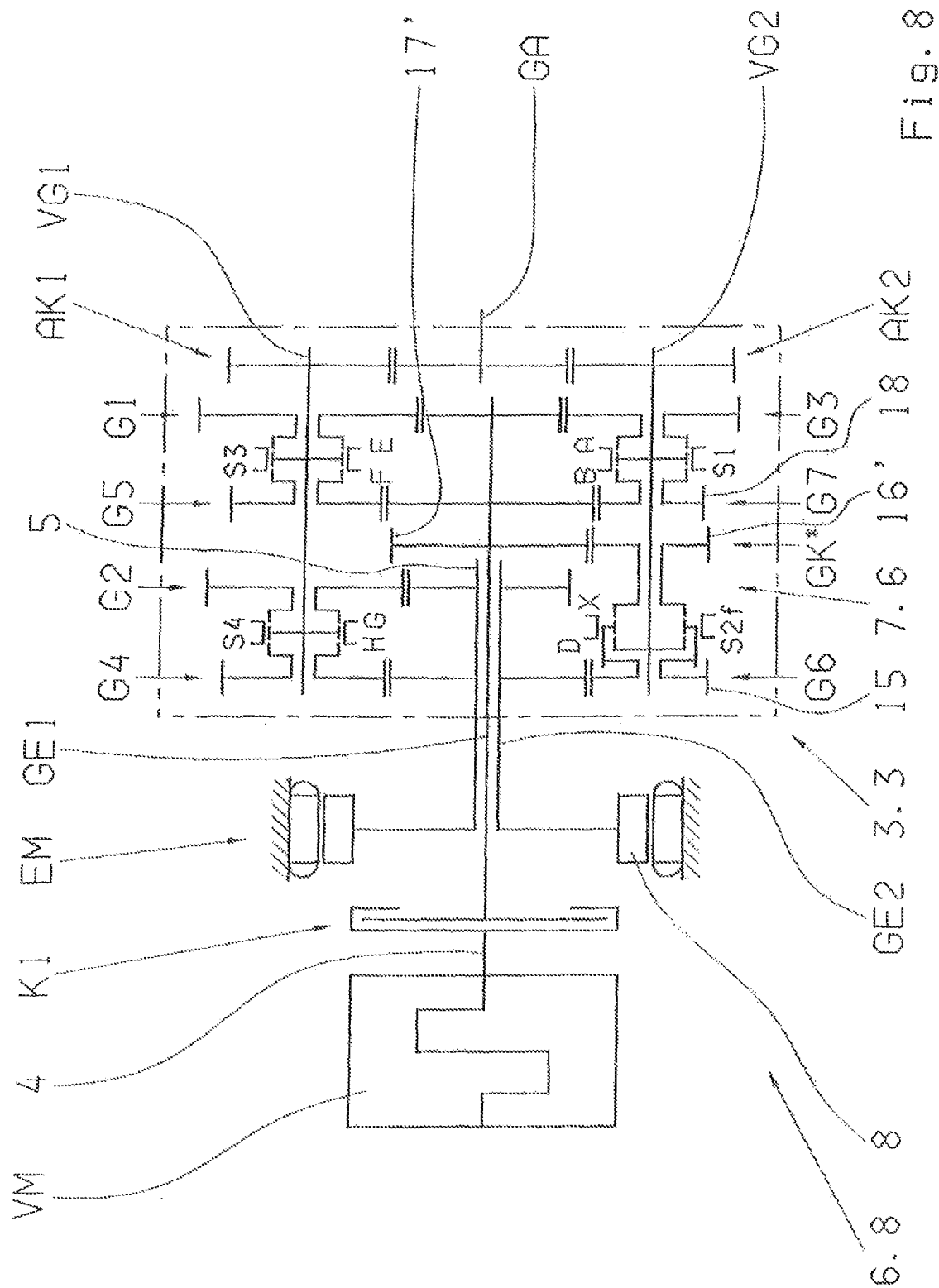

Based on the double clutch transmission 3.0' according to FIG. 15, a first embodiment of a manual transmission 3.3 of a hybrid drives 6.8 according to FIG. 8 is thereby created in accordance with the principle of the invention, such that, instead of the reverse gear set R of the reverse gear and the allocated gear clutch C, a coupling device 7.6 is provided, by means of which the two input shafts GE1, GE2 can be drivingly connected with one another. The coupling device 7.6 comprises a gear step GK* with an idler gear 16' rotatably mounted on the second countershaft VG2 and with a fixed gear 17' disposed on the first input shaft GE1 axially adjacent to the gear-side end 5 of the second input shaft GE2 in a rotationally fixed manner, and also comprises a shifting clutch X, said gear step GK* shifting clutch X being disposed in the manual transmission 3.3, instead of the reverse gear set R and the allocated gear clutch C of the reverse gear of the underlying double clutch transmission 3.0'.

The shifting clutch X of the gear step GK* is integrated with the gear clutch D of the gear set G6 of the sixth forward gear in a common shift set S2f, by means of which the idler gear 15 of the gear set G6 of the sixth forward gear is coupled with the idler gear 16' of the gear step GK* in a rotationally fixed manner in a first shift position, is decoupled in a neutral position, and is connected with the second countershaft VG2 in a rotationally fixed manner in a second shift position.

The effective transmission ratio $i_{GK}*$ of the gear step GK* between the second countershaft VG2 and the second input shaft GE2 preferably corresponds to the transmission ratio $i_{G6}$ of the gear set G6 of the sixth forward gear ($i_{GK}* = i_{G6}$), since the effective clutch transmission ratio $i_K$ between the first input shaft GE1 and the second input shaft GE2 is then equal to one ($i_K = i_{G6}/i_{GK}* = 1$) when the shifting clutch X is engaged.

A second embodiment of the manual transmission 3.4 of a hybrid drives 6.9 according to FIG. 9 derived from the double clutch transmission 3.0' according to FIG. 15 is largely identical to the manual transmission 3.3 according to FIG. 8. The essential difference is in the fact that the coupling device 7.7 now comprises the gear set G7 of the seventh forward gear axially adjacent to the gear-side end 5 of the second input shaft GE2 allocated to the first input shaft GE1, and a shifting clutch Y, that is, instead of a separate gear step GK*, the gear set G7 of the seventh forward gear is also used to couple the two input shafts GE1, GE2.

The shifting clutch Y is integrated with the gear clutch D of the gear set G6 of the sixth forward gear in a common shift set S2g, by means of which the idler gear 15 of the gear set G6 of the sixth forward gear is coupled with the idler gear 18 of the gear set G7 of the seventh forward gear in a rotationally fixed manner in a first shift position, is decoupled in a neutral position, and is coupled with the second countershaft VG2 in a rotationally fixed manner in a second shift position.

The advantage of saving a separate gear step GK* counteracts the possible disadvantage of a clutch transmission ratio $i_K$ that is not equal to one ($i_K \neq 1$). The effective clutch transmission ratio $i_K$ between the first input shaft GE1 and the second input shaft GE2 when the shifting clutch Y is engaged is obtained with the equation $i_K = i_{G7}/i_{G6} < 1$ in the present embodiment of the manual transmission 3.4.

The manual transmissions 3.3, 3.4 of the hybrid drives 6.8, 6.9 according to FIGS. 8 and 9 are also each derived from the double clutch transmission 3.0' according to FIG. 15 with minor changes in a manner that requires no additional installation space and without substantial functional limitations, and can be manufactured in a correspondingly cost-effective manner.

REFERENCE CHARACTERS 1.0 double clutch transmission
1.0' double clutch transmission
1.1 manual transmission
2.0 double clutch transmission
2.0' double clutch transmission
2.1 manual transmission
2.2 manual transmission
3.0 double clutch transmission
3.0' double clutch transmission
3.1 manual transmission
3.2 manual transmission
3.3 manual transmission
3.4 manual transmission
4 drive shaft of a VM (internal combustion engine)
5 gear-side end of GE2
6.1 hybrid drive
6.2 hybrid drive
6.3 hybrid drive
6.4 hybrid drive
6.5 hybrid drive 6.6 hybrid drive
6.7 hybrid drive
6.8 hybrid drive
6.9 hybrid drive
7.1 coupling device
7.2 coupling device
7.3 coupling device
7.4 coupling device
7.5 coupling device
7.6 coupling device
7.7 coupling device
8 rotor of an EM (electric machine)
8' rotor of an EM' (electric machine)
8" rotor of an EM" (electric machine)
9, 9', 9* idler gear of R
10, 10' idler gear of G1
11 idler gear of GK
12 fixed gear of GK
13 idler gear of G4
14 idler gear of R
15 idler gear of G6
16 idler gear of GK'
16' idler gear of GK*
17 fixed gear of GK'
17' fixed gear of GK*
18 idler gear of G
A gear clutch of G2 and G3
AK1 first output constant
AK2 second output constant
B gear clutch of G4 and G7
C gear clutch of R
D gear clutch of G1 and G6
E gear clutch of G3 and G1
EM electric machine
EM' electric machine
EM" electric machine
F gear clutch of G5 and G5
G gear clutch of G2
G1-G7 gear sets of the forward gears
GA output shaft
GE1 first input shaft
GE2 second input shaft
GK gear step
GK' gear step
GK* gear step
H gear clutch of G4
$i_{G1}$ transmission ratio of G1
$i_{G4}$ transmission ratio of G4
$i_{G6}$ transmission ratio of G6
$i_{G7}$ transmission ratio of G7
$i_{GK}$ transmission ratio of GK
$i_{GK}'$ transmission ratio of GK'
$i_{GK}*$ transmission ratio of GK*
$i_K$ clutch transmission ratio
$i_{KE}$ transmission ratio of KE
$i_{KE}'$ transmission ratio of KE'
K1 first friction clutch, separator clutch
K1' dog clutch, separator clutch
K2 second friction clutch
KE input transmission stage
KE' input transmission stage
R reverse gear set of the reverse gear
S shifting clutch
S1-S4 shift sets
S2$a$ shift set
S2$b$ shift set
S2$c$ shift set
S2$d$ shift set
S2$e$ shift set
S2$f$ shift set
S2$g$ shift set
S2$x$ shift set
S2$y$ shift set
T shifting clutch
U shifting clutch
V shifting clutch
VG1 first countershaft
VG2 second countershaft
VM internal combustion engine
W shifting clutch
X shifting clutch
Y shifting clutch

The invention claimed is:

1. A manual transmission of a hybrid drive for a motor vehicle comprising:
first and second input shafts (GE1, GE2) and a common output shaft (GA),
the first input shaft (GE1) being connectable with a drive shaft (4) of an internal combustion engine (VM) such that, upstream of the manual transmission, the first input shaft is solely drivable by the internal combustion engine, and the first input shaft is drivingly connectable with the common output shaft (GA) via a first group of selectively shiftable gearwheel sets (G1, G3, G5; G2, G4, G6),
the second input shaft (GE2) being drivingly connected with a rotor (8, 8', 8") of an electric machine that is operable as a motor and as a generator (EM, EM', EM") such that, upstream of the manual transmission, the second input shaft is solely drivable by the electric machine, and the second input shaft is drivingly connectable with the common output shaft (GA) via a second group of selectively shiftable gearwheel sets (G2, G4; G1, G3, G5, G7),
both the first and the second input shafts (GE1, GE2) are drivingly connectable with one another via a shiftable coupling device (7.1, 7.2, 7.3, 7.4, 7.5),
the first and the second input shafts (GE1, GE2) of the manual transmission are coaxial, and the second input shaft (GE2) being formed as a hollow shaft and the first input shaft (GE1) being coaxially disposed within the second input shaft (GE2), and
the shiftable coupling device (7.1, 7.2, 7.3, 7.4, 7.5) comprises at least one of a gear step (GK, G4; GK', G7) and a shifting clutch (S; T, U; V, W), the coupling device is allocated to the first input shaft (GE1) and disposed axially adjacent to a downstream gear-side end (5) of the second input shaft (GE2), and the coupling device is axially shiftable such that, in a first position, the coupling device drivingly connects the first and the second input shafts and, in a second position, the coupling device engages the gear step.

2. The manual transmission according to claim 1, wherein a gear set (R) axially disposed adjacent to the gear-side end (5) of the second input shaft (GE2) and forms a reverse gear set which is allocated for a reverse gear.

3. The manual transmission according to claim 1, wherein the first and the second groups of selectively shiftable gearwheel sets (G1-G5, R) are each disposed immediately between one of the first and the second input shafts (GE1, GE2) and the common output shaft (GA), and in the first and the second groups of selectively shiftable gearwheel sets, the idler gears (9', 10') and the allocated gear clutches (C, D) of the gear sets (R, G1), are both allocated to the first input shaft (GE1) and axially disposed adjacent to the gear-side end (5) of the second input shaft (GE2) on the output shaft (GA), the coupling device (7.2) comprises a gear step (GK) consisting of another idler gear (11), rotatably mounted on the output shaft (GA) and a fixed gear (12), disposed in a rotationally fixed manner on the gear-side end (5) of the second input shaft (GE2), and another shifting clutch (T) for coupling the idler gear (10') of a remaining gear set (G1) of both of the first and second groups of selectively shiftable gearwheel sets (R, G1) with the other idler gear (11) of the gear step (GK).

4. The manual transmission according to claim 3, wherein, a transmission ratio ($i_{GK}$; $i_{GK'}$) of the gear step (GK; GK') corresponds to a transmission ratio ($i_{G1}$; $i_{G6}$) of the gear set (G1; G6), which can be coupled by the shifting clutch (T; V) of the coupling device (7.2; 7.4) ($i_{GK}=i_{G1}$; $i_{GK'}=i_{G6}$).

5. The manual transmission according to claim 3, wherein the shifting clutch (T, U; V, W) of the coupling device (7.2, 7.3, 7.4, 7.5) is integrated with the gear clutch (D) of the remaining gear set (G1; G6) of the two gear sets (R, G1; R, G6) in a common shift set (S2b, S2c; S2d, S2e), by way of which an idler gear (10'; 15) of a remaining gear set (G1; G6) of the two gear sets (R, G1; R, G6) is coupled with the idler gear (11, 13; 16, 18) of either the gear step (GK; GK') or a transmission-internal gear set (G4; G7) in a rotationally fixed manner in a first shift position, and in a neutral position is decoupled, and, in a second shift position, is connected with either the output shaft (GA) or the respective countershaft (VG2) in a rotationally fixed manner.

6. The manual transmission according to claim 1, wherein the first and second groups of selectively shiftable gearwheel sets (G1-G5, R) are each disposed immediately between one of the first and the second input shafts (GE1, GE2) and the output shaft (GA), and in which the idler gears (9', 10', 13) and the allocated gear clutches (B, C, D) of the gear sets (R, G1), both allocated to the first input shaft (GE1) and disposed axially adjacent to the gear-side end (5) of the second input shaft (GE2) as well as other allocated gear clutches (B, C, D) of a transmission-internal gear set (G4), allocated to the second input shaft (GE2) and disposed on the gear-side end (5) of the second input shaft (GE2), are disposed on the output shaft (GA), the coupling device (7.3) comprises the transmission-internal gear set (G4) and the shifting clutch (U) for coupling an idler gear (10') of a remaining gear set (G1) of the two gear sets (R, G1) with another idler gear (13) of the transmission-internal gear set (G4).

7. The manual transmission according to claim 1, wherein the first and the second groups of selectively shiftable gearwheel sets (G1-G7, R) are each disposed between one of the first and the second input shafts (GE1, GE2) and one of two countershafts (VG1, VG2), each drivingly connected with the output shaft (GA) by an output constant (AK1, AK2), and in which at least idler gears (14, 15) as well as the allocated gear clutches (C, D) of the gear sets (R, G6), both allocated to the first input shaft (GE1) and one (VG2) of the two countershafts (VG1, VG2) and disposed axially adjacent to the gear-side end (5) of the second input shaft (GE2), are disposed on the respective countershaft (VG2), the coupling device (7.4) comprises a gear step (GK'), which comprises an idler gear (16) rotatably mounted on the respective countershaft (VG2) and a fixed gear (17) disposed on the gear-side end (5) of the second input shaft (GE2) in a rotationally fixed manner, the coupling device also comprising the shifting clutch (V) for coupling an idler gear (15) of a remaining gear set (G6) of the two gear sets (R, G6) with the idler gear (16) of the gear step (GK').

8. The manual transmission according to claim 1, wherein the first and the second groups of selectively shiftable gearwheel sets (G1-G7, R) are each disposed between one of the first and the second input shafts (GE1, GE2) and one of two countershafts (VG1, VG2), each drivingly connected with the output shaft (GA) by way of an output constant (AK1, AK2), and in which at least idler gears (14, 15, 18) as well as allocated gear clutches (B, C, D) of the gear sets (R, G6), both allocated to the first input shaft (GE1) and one (VG2) of the two countershafts (VG1, VG2), and disposed axially adjacent to the gear-side end (5) of the second input shaft (GE2), as well as of a transmission-internal gear set (G7), allocated to the second input shaft (GE2) and disposed on the gear-side end (5) of the second input shaft (GE2), are disposed on the respective countershaft (VG2), the coupling device (7.5) comprises the transmission-internal gear set (G7) and a shifting clutch (W) for coupling an idler gear (15) of a remaining gear set (G6) of the two gear sets (R, G6) with the idler gear (18) of the transmission-internal gear set (G7).

9. The manual transmission according to claim 1, wherein the first input shaft (GE1) is connectable with the drive shaft (4) of the internal combustion engine (VM) by a friction clutch (K1).

10. The manual transmission according to claim 1, wherein the first input shaft (GE1) is connectable with the drive shaft (4) of the internal combustion engine (VM) by a dog clutch (K1').

11. The manual transmission according to claim 1, wherein the first input shaft (GE1) is directly connected to the drive shaft (4) of the internal combustion engine (VM) in a rotationally fixed manner.

12. The manual transmission according to claim 1, wherein the electric machine (EM) is disposed coaxially surrounding the first input shaft (GE1), and the rotor (8) of the electric machine (EM) is directly connected, in a rotationally fixed manner, with the second input shaft (GE2).

13. The manual transmission according to claim 1, wherein the electric machine (EM') is disposed upstream of and adjacent to the first input shaft (GE1) and parallel to an axis, and the rotor (8') of the electric machine (EM') is drivingly connected with the second input shaft (GE2) by an input transmission stage (KE) which has a transmission ratio ($i_{KE}$) greater than one ($i_{KE}>1.0$).

14. The manual transmission according to claim 1, wherein the electric machine (EM") is disposed coaxially surrounding the first input shaft (GE1), and the rotor (8") of the electric machine (EM") is drivingly connected with the second input shaft (GE2) by an input transmission stage (KE') designed as a planetary gear assembly which has a transmission ratio ($i_{KE'}$) greater than one ($i_{KE'}>1.0$).

15. A manual transmission of a hybrid drive for a motor vehicle comprising:
  first and second input shafts (GE1, GE2) and a common output shaft (GA),
  the first input shaft (GE1) being connectable with a drive shaft (4) of an internal combustion engine (VM) and drivingly connectable with the common output shaft (GA) via a first group of selectively shiftable gearwheel sets (G1, G3, G5; G2, G4, G6), and the first input shaft is driven on an upstream side thereof solely by the internal combustion engine,
  the second input shaft (GE2) being drivingly connected with a rotor (8, 8', 8") of an electric machine that is operable as a motor and as a generator (EM, EM', EM") and drivingly connectable with the common output shaft (GA) via a second group of selectively shiftable gearwheel sets (G2, G4; G1, G3, G5, G7), and the second input shaft is driven on an upstream side thereof solely by the electric machine, both the first and the second input shafts (GE1, GE2) are drivingly connectable with one another via a shiftable coupling device (7.1, 7.2, 7.3, 7.4, 7.5), the first and the second input shafts (GE1, GE2) of the manual transmission are coaxial, the second input shaft (GE2) being formed as a hollow shaft and the first input shaft (GE1) being coaxially disposed within the second input shaft (GE2), the coupling device (7.1, 7.2, 7.3, 7.4, 7.5) comprises at least one of a gear step (GK, G4; GK', G7) and a shifting clutch (S; T, U; V, W) and is allocated to the first input shaft (GE1) and disposed axially adjacent to downstream gear-side end (5) of the second input shaft (GE2); and in the transmission, the first and the second groups of selectively shiftable gearwheel sets (G1-G5, R) are each disposed immediately between one of the first and the second input shafts (GE1, GE2) and the common output shaft (GA), and in the first and the second groups of selectively shiftable gearwheel sets, at least an idler gear (9) and an allocated gear clutch (C) of a gear set (R) allocated to the first input shaft (GE1) are disposed on the first input shaft (GE1) axially adjacent to the gear-side end (5) of the second input shaft (GE2), and the coupling device (7.1) comprises the shifting clutch (S) for directly coupling the first input shaft (GE1) with the gear-side end (5) of the second input shaft (GE2).

16. The manual transmission according to claim 15, wherein the idler gear (10) and the allocated gear clutch (D) of the axially adjacent gear set (G1) allocated for the first input shaft (GE1) are disposed on the first input shaft (GE1), the shifting clutch (S) of the coupling device (7.1) is integrated with the allocated gear clutch (D) of the adjacent gear set (G1) in a common shift set (S2a), in the common shift set, the first input shaft (GE1) is coupled, in a first shift position, with the second input shaft (GE2) in a rotationally fixed manner, and in a neutral position is decoupled, and, in a second shift position, is coupled with the idler gear of the adjacent gear set (G1) in a rotationally fixed manner.

17. A manual transmission of a hybrid drive for a motor vehicle comprising:

first and second coaxially aligned input shafts (GE1, GE2) and a common output shaft (GA), the first input shaft (GE1) being connectable with a drive shaft (4) of an internal combustion engine (VM) and drivingly connectable with the common output shaft (GA) by way of a first group of selectively shiftable gearwheel sets (G1, G3, G5; G1, G3, G5, G7), and the first input shaft is driven on an upstream side thereof solely by the internal combustion engine, the second input shaft (GE2) being drivingly connected with a rotor (8, 8', 8") of an electric machine that is operable as a motor and as a generator (EM, EM', EM") and drivingly connectable with the common output shaft (GA) by way of a second group of selectively shiftable gearwheel sets (G2, G4; G2, G4, G6), and the second input shaft is driven on an upstream side thereof solely by the electric machine, a coupling device being shiftable between first and second positions, in the first position, the coupling device drivingly connects the first and the second input shafts (GE1, GE2) with one another and, in the second position of the coupling device, the first and the second input shafts are disconnected from each other and the coupling device drivingly connects the first input shaft and the output shaft via a gearwheel set, the second input shaft (GE2) being formed as a hollow shaft and the first input shaft (GE1) being coaxially disposed within the second input shaft (GE2), and the coupling device (7.1, 7.2, 7.3, 7.6, 7.7) comprises at least one of a gear step (GK, G4; GK*, G7) and a shiftable clutch (S; T, U; X, Y), and the gear set is allocated to the second input shaft (GE2), and is disposed axially adjacent to a downstream gear-side end (5) of the second input shaft (GE2).

18. The manual transmission according to claim 17, wherein the gear set (R) disposed on the gear-side end (5) of the second input shaft (GE2) forms a reverse gear set (R) which is allocated for a reverse gear.

19. The manual transmission according to claim 17, wherein the first and the second groups of gearwheel sets (G1-G5, R) are each disposed immediately between one of the first and the second input shafts (GE1, GE2) and the output shaft (GA), and in which at least an idler gear (9*) and the allocated gear clutch (C) of the gear set (R) allocated to the second input shaft (GE2) and disposed on the gear-side end (5) of the second input shaft (GE2), are disposed on the second input shaft (GE2), and the coupling device (7.1) comprises a shifting clutch (S) for directly coupling the gear-side end (5) of the second input shaft (GE2) with the first input shaft (GE1).

20. The manual transmission according to claim 19, wherein an idler gear (10) as well as an allocated gear clutch (D) of the gear set (G1) allocated to the first input shaft (GE1) and disposed axially adjacent to the gear-side end (5) of the second input shaft (GE2) are disposed on the first input shaft (GE1), the shifting clutch (S) of the coupling device (7.1) is integrated with the gear clutch (D) of the gear set (G1) allocated to the first input shaft in a common shift set (S2a), by which (S2a) the first input shaft (GE1) is coupled, in a first shift position, with the second input shaft (GE2) in a rotationally fixed manner, and in a neutral position is decoupled, and, in a second shift position, is coupled with the idler gear of the respective gear set (G1) in a rotationally fixed manner.

21. The manual transmission according to claim 17, wherein the first and the second groups of gearwheel sets (G1-G5, R) are each disposed immediately between one of the first and the second shafts (GE1, GE2) and the output shaft (GA), and in which at least idler gears (9', 10') and allocated gear clutches (C, D) of a transmission-internal gear set (G1) allocated to the first input shaft (GE1) and disposed axially adjacent to the gear-side end (5) of the second input shaft (GE2) as well as a gear set (R), allocated to the second input shaft (GE2) and disposed on the gear-side end (5) of the second input shaft (GE2), are disposed on the output shaft (GA), the coupling device (7.2) comprises another gear step (GK), which comprises an idler gear (11) rotatably mounted on the output shaft (GA) and a fixed gear (12) disposed on the gear-side end (5) of the second output shaft (GE2) in a rotationally fixed manner, the coupling device also comprises a shifting clutch (T) for coupling an idler gear (10') of a transmission-internal gear set (G1) with the idler gear (11) of the other gear step (GK).

22. The manual transmission according to claim 21, wherein the shifting clutch (T, U) of the coupling device (7.2, 7.3) is integrated with the gear clutch (D) of the transmission-internal gear set (G1) in a common shift set (S2b, S2c), by which the idler gear (10') of the transmission-internal gear set (G1) is coupled, in a first shift position, with the idler gear (11, 13) of either the gear step (GK) or the remaining gear set (G4) of the gear sets (G4, R), both allocated to the second input shaft (GE2), in a rotationally fixed manner, and in a neutral position is decoupled, and, in a second shift position, is coupled with the output shaft (GA) in a rotationally fixed manner.

23. The manual transmission according to claim 21, wherein, a transmission ratio ($i_{GK}$; $i^{GK'}$) of the gear step (GK; GK*) corresponds to a transmission ratio ($i_{G1}$; $i_{G6}$) of the gear set (G1; G6) that is connectable by way of the shifting clutch (T; X) of the coupling device (7.2; 7.6) ($i_{GK}=i_{G1}$; $i_{GK*}=i_{G6}$).

24. The manual transmission according to claim 17, wherein the first and the second groups of gearwheel sets (G1-G5, R) are each disposed immediately between one of the first and the second input shafts (GE1, GE2) and the output shaft (GA), and in which at least idler gears (9', 10', 13) and allocated gear clutches (B, C, D) of a transmission-internal gear set (G1) allocated to the first input shaft (GE1) and disposed axially adjacent to the gear-side end (5) of the second input shaft (GE2) as well as the gear sets (G4, R), both allocated to the second input shaft (GE2) and disposed on the gear-side end (5) of the second input shaft (GE2) are disposed on the output shaft (GA), the coupling device (7.3) comprises a remaining gear set (G4) of the gear sets (G4, R), both allocated to the second input shaft (GE2) and a shifting clutch (U) for coupling the idler gear (10') of the transmission-internal gear set (G1) with an idler gear (13) of the remaining gear set (G4).

25. The manual transmission according to claim 17, wherein the first and the second groups of gearwheel sets (G1-G7, R) are each disposed between one of the first and the second input shafts (GE1, GE2) and one of two countershafts (VG1, VG2), each drivingly connected with the output shaft (GA) by an output constant (AK1, AK2), and in which at least idler gears (14, 15) and allocated gear clutches (C, D) of the gear sets (R, G6), both allocated to the second input shaft (GE2) as well as one (VG2) of the two countershafts (VG1, VG2), and disposed on the gear-side end (5) of the second input shaft (GE2), are disposed on the respective countershaft (VG2), the coupling device (7.6) comprises a gear step (GK*), which comprises an idler gear (16') rotatably mounted on the respective countershaft (VG2) and a fixed gear (17') disposed on the input shaft (GE1) in a rotationally fixed manner, the coupling device also comprising a shifting clutch (X) for coupling an idler gear (15) of a remaining gear set (G6) of the gear sets (R, G6), both allocated to the second input shaft (GE2), with the idler gear (16') of the gear step (GK*).

26. The manual transmission according to claim 25, wherein the shifting clutch (X,Y) of the coupling device (7.6, 7.7) is integrated with the gear clutch (D) of the remaining gear set (G6) of the gear sets (R, G6), both allocated to the second input shaft (GE2) in a common shift set (S2f, S2g), by way of which (S2f, S2g) the idler gear (15) of the remaining gear set (G6) is coupled, in a first shift position, with the idler gear (16', 18) of either the gear step (GK*) or the transmission-internal gear set (G7) allocated to the first input shaft (GE1) in a rotationally fixed manner, and in a neutral position is decoupled, and, in a second shift position, is coupled with the respective countershaft (VG2) in a rotationally fixed manner.

27. The manual transmission according to claim 17, wherein the first and the second groups of gearwheel sets (G1-G7, R) are each disposed between one of the first and the second input (GE1, GE2) and one of two countershafts (VG1, VG2), each drivingly connected with the output shaft by an output constant (AK1, AK2), and in which at least idler gears (14, 15, 18) and allocated gear clutches (B, C, D) of the gear sets (R, G6), both allocated to the second input shaft (GE2) and one (VG2) of the two countershafts (VG1, VG2) and disposed on the gear-side end (5) of the second input shaft (GE2), as well as a transmission-internal gear set (G7) allocated to the first input shaft (GE1) and disposed axially adjacent to the gear-side end (5) of the second input shaft (GE2), are disposed on the respective countershaft (VG2), the coupling device (7.7) comprises the transmission-internal gear set (G7) and a shifting clutch (Y) for coupling an idler gear (15) of a remaining gear set (G6) of the gear sets (R, G6) both allocated to the second input shaft (GE2) with an idler gear (18) of the transmission-internal gear set (G7).

* * * * *